(12) United States Patent
Herman et al.

(10) Patent No.: US 6,856,472 B2
(45) Date of Patent: Feb. 15, 2005

(54) PANORAMIC MIRROR AND SYSTEM FOR PRODUCING ENHANCED PANORAMIC IMAGES

(75) Inventors: Herman Herman, Pittsburgh, PA (US); Sanjiv Singh, Pittsburgh, PA (US)

(73) Assignee: EyeSee360, Inc., Pittsburgh, PA (US)

(*) Notice: Subject to any disclaimer, the term of this patent is extended or adjusted under 35 U.S.C. 154(b) by 158 days.

(21) Appl. No.: 10/080,834

(22) Filed: Feb. 22, 2002

(65) Prior Publication Data

US 2002/0159166 A1 Oct. 31, 2002

Related U.S. Application Data

(60) Provisional application No. 60/271,154, filed on Feb. 24, 2001, provisional application No. 60/326,013, filed on Sep. 27, 2001, provisional application No. 60/348,471, filed on Oct. 29, 2001, provisional application No. 60/337,553, filed on Nov. 8, 2001, and provisional application No. 60/346,717, filed on Jan. 7, 2002.

(51) Int. Cl.[7] .......................... G02B 13/06; G02B 17/00
(52) U.S. Cl. ...................................... 359/725; 359/727
(58) Field of Search .................. 359/725, 726–728, 359/364, 402–403, 618; 348/36–39

(56) References Cited

U.S. PATENT DOCUMENTS

| 994,935 | A | | 6/1911 | Kleinschmidt ................ 396/21 |
|---|---|---|---|---|
| 3,846,809 | A | | 11/1974 | Pinzone et al. ................ 396/21 |
| 4,429,957 | A | | 2/1984 | King ........................... 359/676 |
| D312,263 | S | | 11/1990 | Charles ...................... D16/237 |
| 5,115,266 | A | | 5/1992 | Troje ............................ 396/21 |
| 5,760,826 | A | | 6/1998 | Nayar .......................... 348/36 |
| 5,790,181 | A | | 8/1998 | Chahl et al. .................. 348/36 |
| 5,920,376 | A | | 7/1999 | Bruckstein et al. ........... 352/69 |
| 6,118,474 | A | * | 9/2000 | Nayar .......................... 348/36 |
| 6,157,018 | A | | 12/2000 | Ishiguro et al. ............. 250/208 |
| 6,175,454 | B1 | | 1/2001 | Hoogland et al. .......... 359/725 |
| 6,222,683 | B1 | | 4/2001 | Hoogland et al. .......... 359/725 |
| 6,304,285 | B1 | | 10/2001 | Geng ........................... 348/36 |
| 6,313,865 | B1 | | 11/2001 | Driscoll, Jr. et al. ......... 348/36 |
| 6,333,826 | B1 | | 12/2001 | Charles ...................... 359/725 |
| 6,704,148 | B2 | * | 3/2004 | Kumata ...................... 359/725 |
| 6,738,569 | B1 | * | 5/2004 | Sogabe et al. ................ 396/21 |
| 2001/0010555 | A1 | | 8/2001 | Driscoll, Jr. ................ 348/335 |
| 2001/0015751 | A1 | | 8/2001 | Geng ........................... 348/36 |
| 2002/0006000 | A1 | | 1/2002 | Kumata et al. ............. 359/853 |
| 2002/0126395 | A1 | * | 9/2002 | Gianchandani et al. ..... 359/725 |

FOREIGN PATENT DOCUMENTS

| DE | 195 42 355 A1 | 5/1997 |
|---|---|---|
| DE | 100 00 673 A1 | 7/2001 |
| FR | 1234341 | 10/1960 |
| WO | WO 00/11512 | 3/2000 |

OTHER PUBLICATIONS

R. A. Hicks et al., "Catadioptric Sensors That Approximate Wide–Angle Perspective Projections," Drexel University and National Science Foundation, pp. 1–7.

J. S. Chahl et al., "Reflective Surfaces for Panoramic Imaging," Applied Optics, vol. 36, No. 31, Nov. 1, 1997, pp. 8275–8285.

M. Ollis et al., "Analysis and Design of Panoramic Stereo Vision Using Equi–Angular Pixel Cameras," The Robotics Institute, Carnegie Mellon University, CMU–RI–TR–99–04, Jan. 1999, pp. 1–43.

* cited by examiner

Primary Examiner—Jordan M. Schwartz
(74) Attorney, Agent, or Firm—Lara A. Northrop, Esq.; Alan E. Towner, Esq.; Piertragallo, Bosick & Gordon

(57) ABSTRACT

The present invention relates to providing enhanced panoramic images with an improved panoramic mirror. A panoramic mirror is provided with a controlled vertical field of view. The controlled vertical field of view improves the resolution of a viewable panoramic image by eliminating portions of unwanted images from the viewable panoramic image.

53 Claims, 21 Drawing Sheets

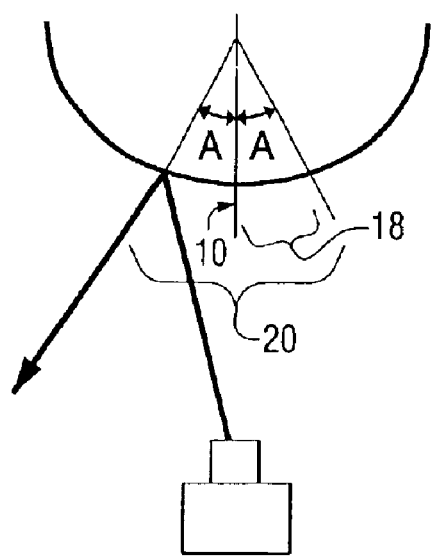
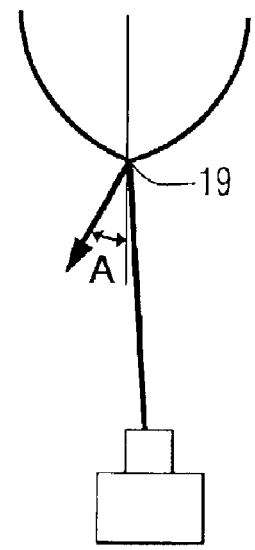
FIG. 7A  FIG. 7B
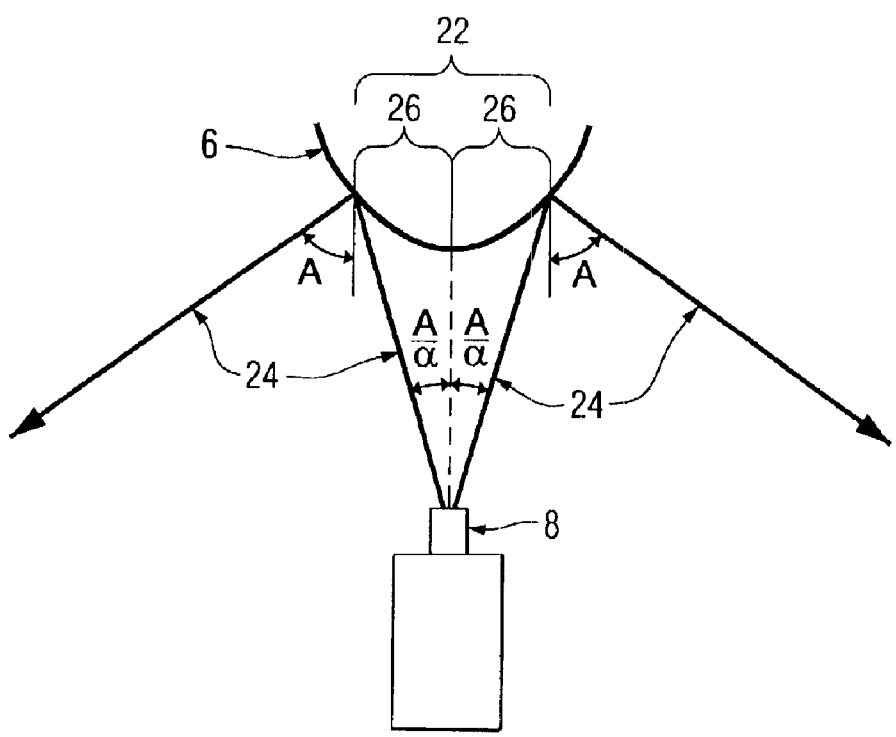
FIG. 8

PANORAMIC MIRROR AND SYSTEM FOR PRODUCING ENHANCED PANORAMIC IMAGES

CROSS-REFERENCE TO RELATED APPLICATIONS

This application claims the benefit of U.S. Provisional Application Ser. No. 60/271,154 filed Feb. 24, 2001; U.S. Provisional Application Ser. No. 60/326,013 filed Sep. 27, 2001; U.S. Provisional Application Ser. No. 60/348,471 filed Oct. 29, 2001; U.S. Provisional Application Ser. No. 60/337,553 filed Nov. 8, 2001; and U.S. Provisional Application Ser. No. 60/346,717 filed Jan. 7, 2002.

FIELD OF THE INVENTION

The present invention relates to panoramic imaging, and more particularly relates to an improved panoramic mirror for providing enhanced panoramic images.

BACKGROUND INFORMATION

Recent work has shown the benefits of panoramic imaging, which is able to capture a large azimuth view with a significant elevation angle. If instead of providing a small conic section of a view, a camera could capture an entire half-sphere or more at once, several advantages could be realized. Specifically, if the entire environment is visible at the same time, it is not necessary to move the camera to fixate on an object of interest or to perform exploratory camera movements. Additionally, this means that it is not necessary to stitch multiple, individual images together to form a panoramic image. This also means that the same panoramic image or panoramic video can be supplied to multiple viewers, and each viewer can view a different portion of the image or video, independent from the other viewers.

One method for capturing a large field of view in a single image is to use an ultra-wide angle lens. A drawback to this is the fact that a typical 180-degree lens can cause substantial amounts of optical distortion in the resulting image.

A video or still camera placed below a convex reflective surface can provide a large field of view provided an appropriate mirror shape is used. Such a configuration is suited to miniaturization and can be produced relatively inexpensively. Spherical mirrors have been used in such panoramic imaging systems. Spherical mirrors have constant curvatures and are easy to manufacture, but do not provide optimal imaging or resolution.

Hyperboloidal mirrors have been proposed for use in panoramic imaging systems. The rays of light which are reflected off of the hyperboloidal surface, no matter where the point of origin, all converge at a single point, enabling perspective viewing. A major drawback to this system lies in the fact that the rays of light that make up the reflected image converge at the focal point of the reflector. As a result, positioning of the sensor relative to the reflecting surface is critical, and even a slight disturbance of the mirror will impair the quality of the image. Another disadvantage is that the use of a perspective-projections model inherently requires that, as the distance between the sensor and the mirror increases, the cross-section of the mirror must increase. Therefore, in order to keep the mirror at a reasonable size, the mirror must be placed close to the sensor. This causes complications to arise with respect to the design of the image sensor optics.

Another proposed panoramic imaging system uses a parabolic mirror and an orthographic lens for producing perspective images. A disadvantage of this system is that many of the light rays are not orthographically reflected by the parabolic mirror. Therefore, the system requires an orthographic lens to be used with the parabolic mirror.

The use of equi-angular mirrors has been proposed for panoramic imaging systems. Equi-angular mirrors are designed so that each pixel spans an equal angle irrespective of its distance from the center of the image. An equi-angular mirror such as this can provide a resolution superior to the systems discussed above. However, when this system is combined with a camera lens, the combination of the lens and the equi-angular mirror is no longer a projective device, and each pixel does not span exactly the same angle. Therefore, the resolution of the equi-angular mirror is reduced when the mirror is combined with a camera lens.

Ollis, Herman, and Singh, "Analysis and Design of Panoramic Stereo Vision Using Equi-Angular Pixel Cameras", CMU-RI-TR-99-04, Technical Report, Robotics Institute, Carnegie Mellon University, January 1999, disclose an improved equi-angular mirror that is specifically shaped to account for the perspective effect a camera lens adds when it is combined with such a mirror. This improved equi-angular mirror mounted in front of a camera lens provides a simple system for producing panoramic images that have a very high resolution. However, this system does not take into account the fact that there may be certain areas of the resulting panoramic image that a viewer may have no desire to see. Therefore, some of the superior image resolution resources of the mirror are wasted on non-usable portions of the image.

The present invention has been developed in view of the foregoing and to address other deficiencies of the prior art.

SUMMARY OF THE INVENTION

The present invention improves the usable resolution of panoramic mirrors.

An aspect of the present invention is to provide a panoramic photographic apparatus comprising a mirror, and a means for mounting the mirror on an axis. The mirror includes a convex reflective surface symmetric about the axis, and the surface forms a first angle C with respect to a first plane perpendicular to the axis at a point of intersection between the axis and the mirror, the first angle C being determined by a lower limit of a controlled vertical field of view.

Another aspect of the present invention is to provide a panoramic photographic apparatus comprising a rod positioned on an axis, and a mirror mounted at a first end of the rod. The mirror includes a convex reflective surface symmetric about the axis, and the surface forms a first angle E with respect to a first plane perpendicular to the axis at a point of intersection between the rod and the mirror, the first angle E being determined by a lower limit of a controlled vertical field of view.

A further aspect of the present invention is to provide a system for providing enhanced panoramic images comprising a mirror, a means for mounting the mirror on an axis, and a camera with a lens. The mirror includes a convex reflective surface symmetric about the axis, and the surface forms a first angle C with respect to a first plane perpendicular to the axis at a point of intersection between the axis and the mirror, the first angle C being determined by a lower limit of a controlled vertical field of view. The camera is positioned so that the lens is substantially aligned with the axis.

Another aspect of the present invention is to provide a system for providing enhanced panoramic images comprising a mirror, a rod positioned on an axis, a means for mounting the mirror on an axis, and a camera with a lens. The mirror includes a convex reflective surface symmetric about the axis, and the surface forms a first angle E with respect to a first plane perpendicular to the axis at a point of intersection between the rod and the mirror, the first angle E being determined by a lower limit of a controlled vertical field of view. The camera is positioned so that the lens is substantially aligned with the axis.

A further aspect of the present invention is to provide a method of providing enhanced panoramic images. The method includes the step of optimizing a resolution of a mirror by selecting the resolution based upon controlling at least one parameter selected from: a shape of the mirror, an upper limit of a controlled vertical field of view, a lower limit of a controlled vertical field of view, an upper limit of a desired vertical field of view, a lower limit of a desired vertical field of view, and a vertical pixel radius.

Another aspect of the present invention is to provide a method of providing enhanced panoramic images. The method includes the steps of providing a camera with a mirror, wherein the mirror includes a convex reflective surface symmetric about an axis, obtaining a raw panoramic image using the camera and the mirror, the image having pixel representations comprising a vertical pixel radius, a horizontal pixel circumference at an upper limit of a desired vertical field of view, and a horizontal pixel circumference at a lower limit of a desired vertical field of view, and optimizing a resolution of the mirror by modifying the mirror to obtain desired pixel representations.

These and other aspects of the present invention will be more apparent from the following description.

BRIEF DESCRIPTION OF THE DRAWINGS

FIG. 7A shows a cross sectional image of a convex reflective mirror before an interior part of the two-dimensional mirror profile is removed.

FIG. 7B illustrates how the lower limit of the controlled vertical field of view can be selected by removing an interior part of the mirror profile in accordance with an embodiment of the present invention.

FIG. 8 illustrates how the lower limit of the controlled vertical field of view can be selected by removing an interior part of the mirror profile in accordance with another embodiment of the present invention.

DETAILED DESCRIPTION OF THE INVENTION

The present invention improves the usable resolution of panoramic mirrors and provides enhanced panoramic images.

As used herein, the term "panoramic images" means wide-angle images taken from a field of view of from about 60° to 360°, typically from about 90° to 360°. Preferably, the panoramic visual images comprise a field of view from about 180° to 360°. In a particular embodiment, the field of view is up to 360° in a principal axis, which is often oriented to provide a 360° horizontal field of view. In this embodiment, a secondary axis may be defined, e.g., a vertical field of view. The vertical field of view may be defined with respect to the optical axis of a camera lens, with the optical axis representing 0°. Such a vertical field of view may range from 0.1° to 180°, for example, from 1° to 160°. In accordance with the present invention, the vertical field of view is controlled in order to maximize the resolution of the portion of the panoramic image that the viewer is most interested in seeing. In order to maximize the resolution of the portion of the panoramic image that the viewer desires to see, the vertical field of view is controlled in an attempt to eliminate unwanted portions of the panoramic image from the resulting viewable panoramic image. However, the particular controlled vertical field of view chosen may not fully eliminate unwanted portions of the panoramic image from the viewable panoramic image. For example, in order to provide a panoramic image with improved resolution and minimal unwanted portions of the panoramic image, the controlled vertical field of view may range from about 2° to about 160°, preferably from about 5° to about 150°. A particularly preferred controlled vertical field of view that provides panoramic images with improved resolution and minimal unwanted portions of the panoramic image ranges from about 10° to about 140°.

As used herein, the terms "high-resolution" and/or "improved resolution" mean panoramic images having a viewable resolution of at least 0.3 M pixel, preferably having a viewable resolution of at least at least 0.75 M pixel. In a particular embodiment, the terms "high-resolution" and/or "improved resolution" mean panoramic images having a viewable resolution of at least 1 M pixel.

Figure 1:
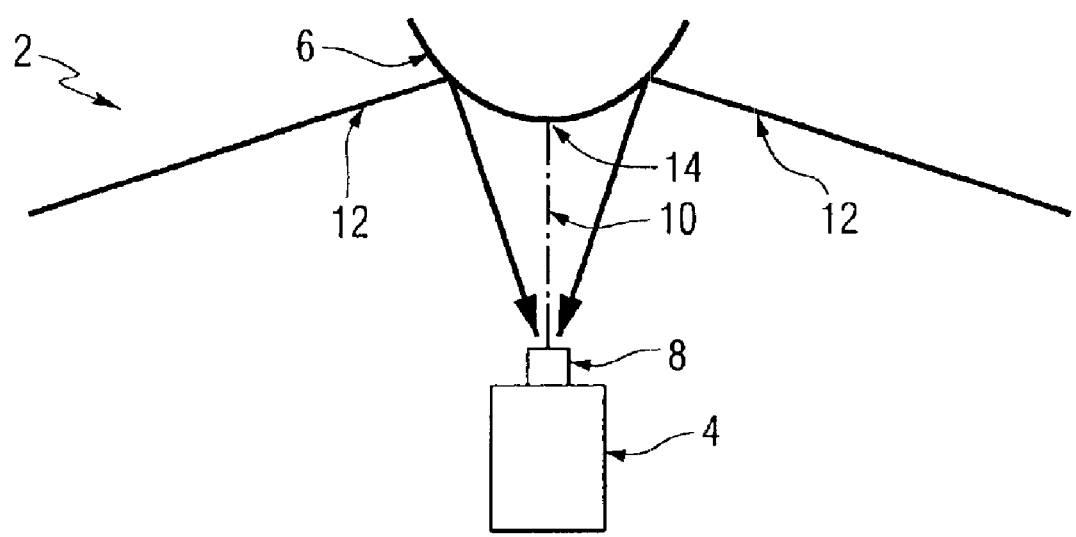
FIG. 1 shows a sectional schematic diagram illustrating a system for combining a camera with a convex reflective surface for producing panoramic images.

Reflective optics offer a solution to the problem of immersive imaging. A camera placed below a convex reflective surface can produce a large field of view provided an appropriate mirror shape is provided. FIG. 1 is a schematic diagram illustrating a system 2 for combining a camera 4 with a mirror 6 for producing panoramic images. Typically the mirror 6 is mounted in front of a camera lens 8 with a suitable mounting device (not shown). The mirror 6 having a central axis 10 gathers light 12 from all directions and redirects it to camera 4. The mirror 6 has a symmetric shape. As used herein, the terms "symmetric" and "symmetrical" mean that the mirror is symmetrical about an axis of rotation. The axis of rotation corresponds to the central axis of the mirror and typically corresponds to the optical axis of the camera used with the mirror. An axial center 14 can be defined, which is at the intersection of the central axis 10 and the surface of the mirror 6.

A panoramic image is typically captured with a system, such as the system 2 of FIG. 1, by mounting the camera on a tripod or holding the camera with the camera pointing up in a vertical direction. For example, when capturing a panoramic image of a room, the camera would normally be oriented with the camera pointing in a vertical direction towards the ceiling of the room. The resulting panoramic image would show the room with the ceiling at the upper portion of the image and the floor at the lower portion of the image. As used wherein, the terms "upper" and/or "top", and the terms "lower" and/or "bottom" refer to a panoramic image oriented in the same way. However, it is to be understood that a panoramic image of a room, for example, may also be captured by orienting the camera in a vertical direction towards the floor of the room, and such an orientation is within the present scope of the invention. When using such an orientation, the terms "upper" and/or "top", and the terms "lower" and/or "bottom" would have the reverse orientation and meaning.

Figure 2:
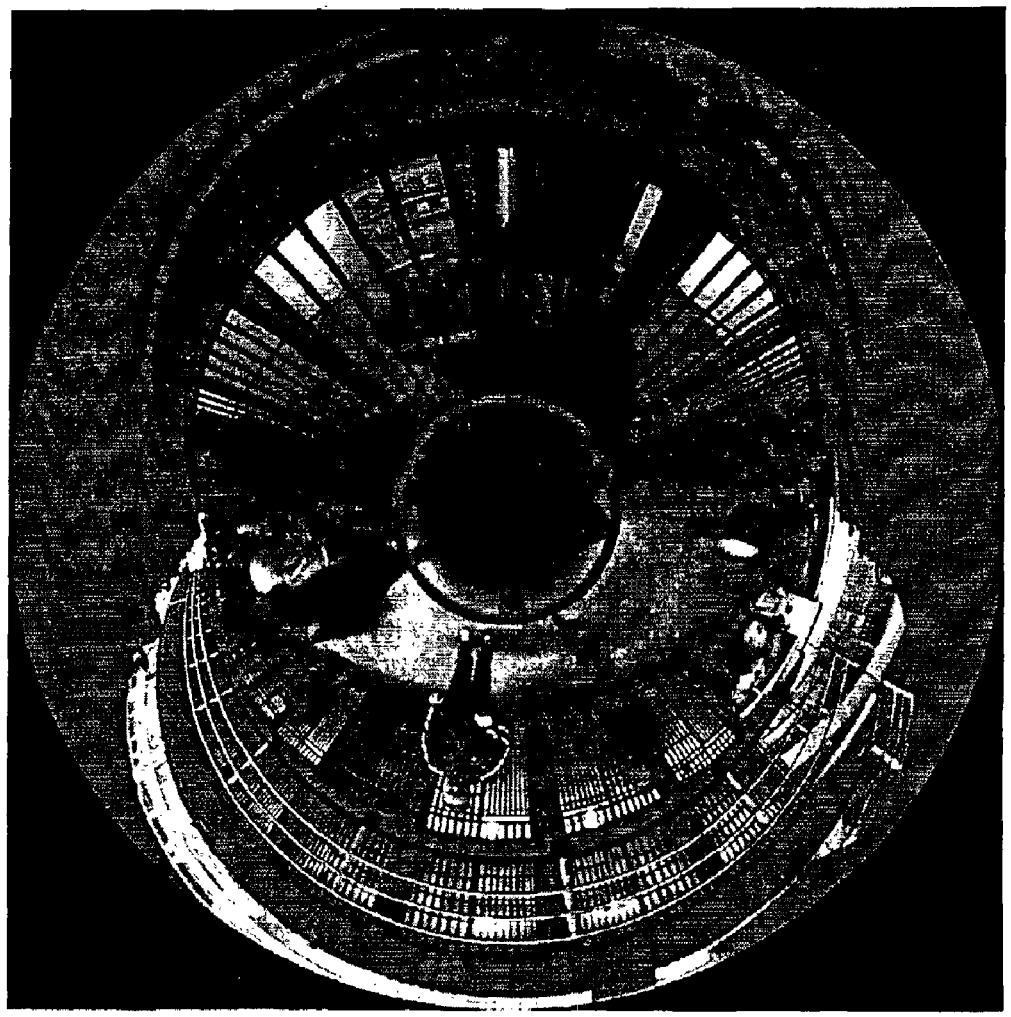
FIG. 2 shows a raw 360° image captured with a panoramic camera in accordance with an embodiment of the present invention.
Figure 3:
FIG. 3 shows the raw 360° image of FIG. 2 unwarped into a viewable panoramic image camera in accordance with an embodiment of the present invention.

One common application of this system is to capture a raw 360° image with the convex reflective surface, and unwarp the raw 360° image into a viewable panoramic image. FIG. 2 shows such a raw 360° image, and FIG. 3 shows the raw 360° image of FIG. 2 unwarped into a viewable panoramic image. As used herein, the term "viewable panoramic image" includes, for example, a panoramic image presented as a rectangular image using a projection onto a cylindrical surface, a panoramic image presented as a six sided cubic, or a panoramic image presented in an equi-rectangular form. However, it is to be understood that panoramic images may be presented in many other desired viewable formats that are known in the art, and these other viewable formats are within the scope of the present invention.

The use of such imagery has distinct advantages. It is a passive sensor, so power requirements are minimal. It has the potential to be extremely robust, since the sensor is purely solid state and has no moving parts. Furthermore, curved mirrors can be made free of optical distortion that is typically seen in lenses. In addition, the large field of view available offers substantial advantages for panoramic photography, target tracking, obstacle detection, localization, and tele-navigation of machinery.

In the system 2 of FIG. 1, the camera 4 can image a full 360 degrees in azimuth and approach 180 degrees in elevation with an appropriately shaped mirror. Unfortunately, obtaining such a large horizontal and vertical field of view comes at the cost of resolution. This is because a fixed amount of pixels are being spread over a large field of view. For example, if a 3 M pixel camera is used with a standard 30×40 degree camera lens, the resulting picture will have a relatively high pixel density. However, if the same 3 M pixel camera is used with a panoramic mirror to capture a panoramic image, the same amount of pixels will now be spread over an area as large as 360×180 degrees. In order for the system 2 of FIG. 1 to be beneficial, a panoramic mirror must be used that produces a panoramic image with a high resolution. Furthermore, since the amount of available resolution from a panoramic mirror is limited, it is very important to ensure that only a minimal amount, if any, of this resolution is utilized on portions of the panoramic image that are of least interest to the viewer.

For example, in the system 2 of FIG. 1, if a panoramic image is captured with a 180° vertical field of view, a viewer will typically be most interested in the portion of the panoramic image that is off to the sides of the mirror, possibly from about 40° to about 140°, and will typically be least interested in the portion of the panoramic image that appears closer to the bottom of the panoramic image, from about 0° to 40°, or the portion of the image that appears closer to the top of the panoramic image, from about 140° to 180°. Unfortunately, these least desirable portions of the panoramic image are still captured by the panoramic mirror and will appear in the resulting viewable panoramic image. Thus, the available resolution of the panoramic mirror is wasted on these least desired portions of the panoramic image.

An embodiment of the present invention provides a high-resolution panoramic mirror designed with a controlled vertical field of view. As used herein, the term "controlled vertical field of view" refers to a vertical field of view that is adjusted in order to minimize unwanted images from being captured by the panoramic mirror and thereby appearing in the viewable panoramic image, and to maximize the resolution of the portion of the viewable panoramic image that the user desires to see. The controlled vertical field of view may range from about 2° to about 170°, preferably from about 5° to about 150°. A particularly preferred controlled vertical field of view that provides panoramic images with improved resolution and minimal unwanted portions of the panoramic image ranges from about 10° to about 140°. In this embodiment, the high-resolution qualities of the mirror provide resulting high-resolution panoramic images, while the controlled vertical field of view further increases the resolution of the resulting viewable panoramic image.

In a preferred embodiment, a mirror shape is used that is exactly equi-angular when combined with camera optics. In such an equi-angular mirror/camera system, each pixel in the image spans an equal angle irrespective of its distance from the center of the image, and the shape of the mirror is modified in order to compensate for the perspective effect a camera lens adds when combined with the mirror, thereby providing improved high-resolution panoramic images.

Figure 4:
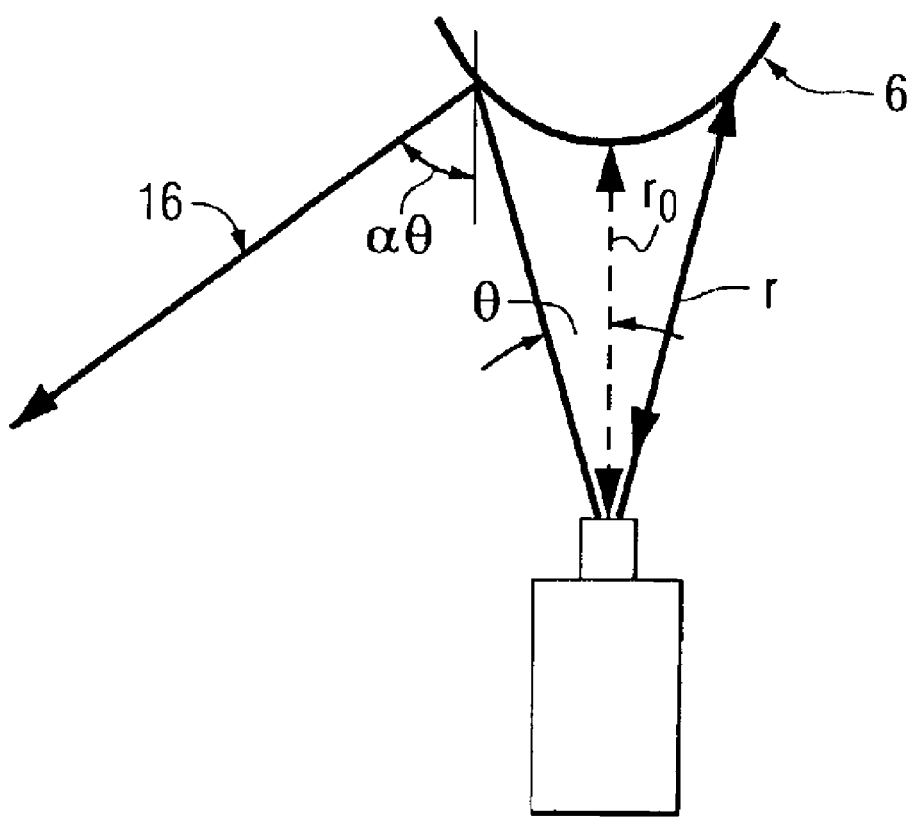
FIG. 4 shows the geometry of an equi-angular mirror.

FIG. 4 shows the geometry of an equi-angular mirror 6. The reflected ray 16 is magnified by a constant gain of α, irrespective of location along the vertical profile. The general form of these mirrors is given in equation (1):

$$\cos\left(\theta 1 + \frac{\alpha}{2}\right) = (r/r_0)^{-(1+\alpha)/2} \qquad (1)$$

For different values of α, mirrors can be produced with a high degree of curvature or a low degree of curvature, while still maintaining their equi-angular properties. In one embodiment, ax ranges from about 3 to about 15, preferably from about 5 to about 12. In a particular embodiment, α is chosen to be 11.

Figure 5:
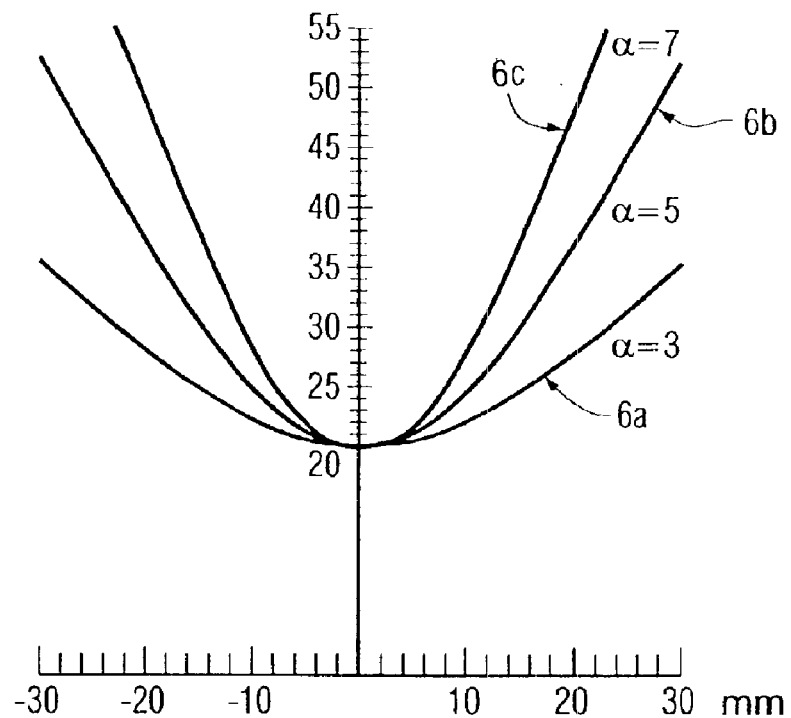
FIG. 5 shows equiangular mirror shapes for a gain α of 3, 5, and 7.

FIG. 5 shows mirrors 6a, 6b, and 6c with curvatures corresponding to α=3, 5, and 7, respectively. One advantage of these mirrors is that the resolution is unchanged when the camera is pitched or yawed.

It has been determined that the addition of a camera with a lens introduces an effect such that each pixel does not span the same angle. This is because the combination of the mirror and the camera is no longer a projective device. Hence, to be exactly equi-angular, the mirror may be shaped to account for the perspective effect of the lens and the algorithms must be modified. Such a modified equi-angular mirror shape is defined herein as a "compensated equi-angular mirror."

It is possible to make a small angle approximation by assuming that each pixel spans an equal angle. The following equation (2) can be used to derive the mirror shape:

$$\frac{dr}{d\theta} = r\cot\left(k\theta + \frac{\pi}{2}\right) \qquad (2)$$
$$k = (-1-\alpha)/2$$

Since the camera is still a projective device this only works for small fields of view. Surfaces of mirrors in which each pixel truly corresponds to an equal angle are shapes that satisfy the polar coordinate equation (3) below:

$$\frac{dr}{d\theta} = r\cot\left(k\tan\theta + \frac{\pi}{2}\right) \qquad (3)$$

The advantage of using equation (2) is that the surfaces produced have a closed-form solution, whereas equation (3) must be solved numerically. However, the result of solving equation (3) numerically is that it produces a profile of the mirror that produces a truly equi-angular relation where each pixel in the image has the same vertical field of view.

Figure 6:
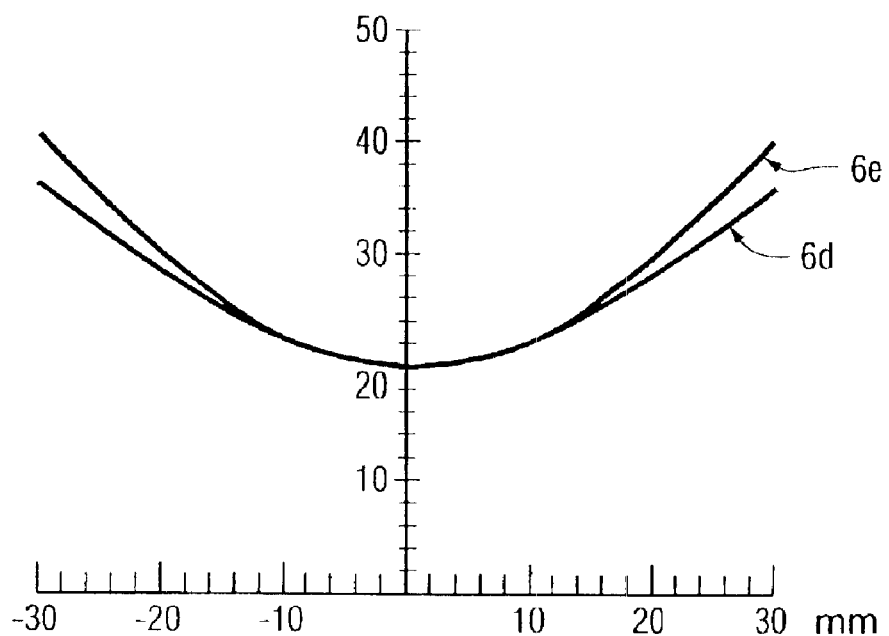
FIG. 6 shows an equi-angular mirror that provides approximately equal angles for each pixel and a compensated equi-angular mirror that provides exactly equal angles for each pixel when α is equal to 3.

FIG. 6 shows the difference in the mirror shapes. For α equal to 3, an equi-angular mirror 6d that provides approximately equal angles for each pixel and a compensated equi-angular mirror 6e that provides truly equal angles for each pixel is shown.

A typical convex mirror will have a continuous surface across any diameter. Because of this constraint, a significant portion of the imaged surface area of the mirror is likely to reflect portions of a panoramic image that the viewer is least interested in seeing. The pixels in the resulting photograph that reflect such unwanted portions of the panoramic image end up not being efficiently utilized. It is desirable to minimize these unwanted portions of the panoramic image. This is especially important when resolution is at a premium, as is the case with panoramic mirrors.

In one embodiment, a panoramic mirror is fabricated with a controlled vertical field of view. By fabricating a mirror with such a controlled vertical field of view, less desired portions of the panoramic image can be substantially reduced or eliminated from the resulting panoramic image. A compensated equi-angular mirror is most suited to be used in this embodiment. This is because the uniform distribution of resolution along any radius of the mirror provides the most effective elimination of less desired portions of the panoramic image, in addition to producing high-resolution panoramic images.

In one embodiment, in order to select the lower limit of the controlled vertical field of view, a convex shaped panoramic mirror, such as a compensated equi-angular panoramic mirror, can be fabricated into a point at the center of the mirror. As an illustration, a two-dimensional profile of such a mirror can be depicted by removing a conical portion from the center of the two-dimensional mirror profile and constricting the resulting two-dimensional mirror profile at the center to form a point. This constricted shape is illustrated in the sectional views shown in FIGS. 7A and 7B. A cross sectional image of the profile as shown in FIG. 7A may be modified by "trimming" an equal amount of surface 18 on either side of the central axis 10. The two separated segments can then be brought together, forming a point 19, as shown in FIG. 7B. The entire portion of the surface to be removed 20 corresponds to the angle 2A and is shown in FIG. 7A. This is the portion of the mirror that would normally reflect portions of the panoramic image towards the bottom of the surrounding scene that the viewer is most likely not interested in viewing. As an example, angle A ranges from about 20 to about 45°, preferably from about 5° to about 30°. In a particular embodiment, angle A is about 10°.

As another illustration, shown in FIG. 8, the unwanted portion of the mirror 22 to be removed may be determined by tracing a light ray 24 as it reflects from the camera lens 8 to the mirror 6, and then from the mirror 6 at the desired angle A, corresponding to the lower limit of the controlled vertical field of view. If the light ray 24 reflects from the mirror 6 at a desired angle A, then the light ray 24 will reflect from the camera lens 8 to the mirror 6 at an angle A/α, with α being the gain of the mirror. The portions of the mirror 26 that are encompassed by the angle A/α on either side of the central axis of the mirror comprise the unwanted portion 22 of the mirror to be removed.

Figure 9:
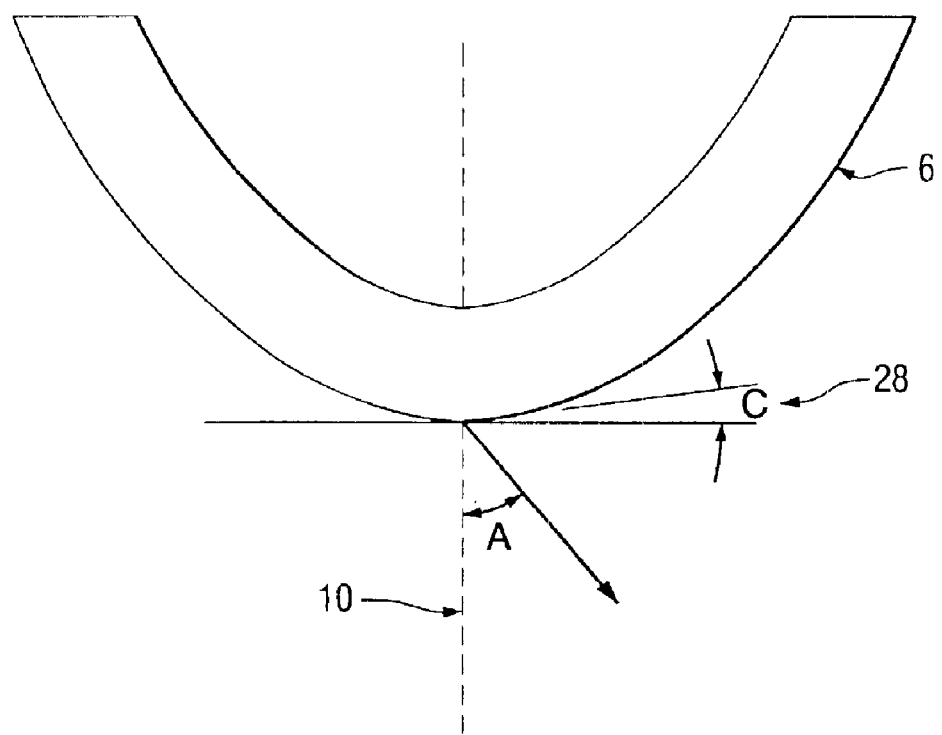
FIG. 9 shows how an angle C can be formed with respect to a first plane perpendicular to a central axis at a point of intersection between the central axis and a mirror, in accordance with an embodiment of the present invention.

Once a two-dimensional mirror profile is developed, as shown in FIG. 7B, an angle C can be formed, shown in FIG. 9 as 28, with respect to a first plane perpendicular to the central axis 10 at a point of intersection between the central axis and the mirror 6. This angle C is dependant upon angle A, which defines the lower limit of the controlled vertical field of view. Equation (4) shows the relationship between angle C and angle A as:

$$C = A/2 \quad (4)$$

In one embodiment, Angle C ranges from about 0.5° to about 20°, preferably from about 1° to about 10°, more preferably from about 2° to about 8°. In a particular embodiment, angle C is about 5°.

For a compensated equi-angular panoramic mirror manufactured with a total cone angle of 2A removed from the center of the mirror, the relationship that describes the resulting mirror profile can now be written in equation (5) as:

$$\frac{dr}{d\left(\theta + \frac{A}{\alpha}\right)} = r\cot\left(k\tan\left(\theta + \frac{A}{\alpha}\right) + \frac{\pi}{2}\right) \quad (5)$$

As is the case with equation (3), equation (5) must also be solved numerically based on various values substituted for θ. θ is the angle that a light ray makes with the central axis as it reflects off of a point on the surface of the mirror and into the camera lens.

Figure 10:
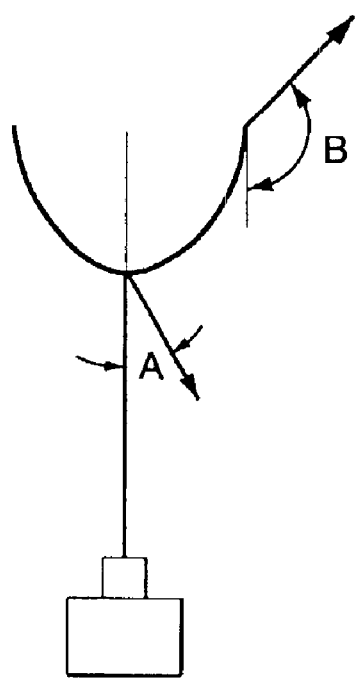
FIG. 10 shows how the upper limit of the controlled vertical field of view can be selected in accordance with an embodiment of the present invention.

In another embodiment, the upper limit of the controlled vertical field of view can be denoted by angle B, shown in FIG. 10. Angle B may be selected by changing the bounds used to numerically solve equation (5). Referring to equation (5), dr/d(θ+(A/α)) can be evaluated at a range of points by integrating between θ=A/α and θ=B/α. This would result in a mirror shape with an upper limit to the controlled vertical field of view, angle B, as desired. As an example, angle B ranges from about 95° to about 180°, preferably from about 120° to about 170°. In a particular embodiment, angle B is about 140°.

Figure 11:
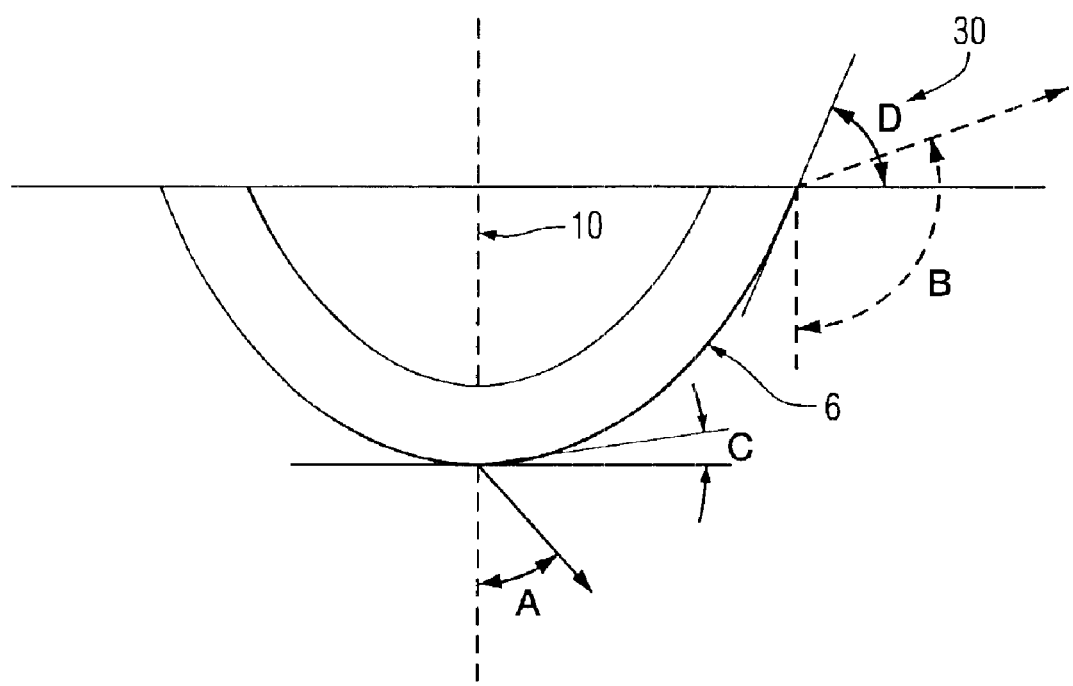
FIG. 11 shows how an angle D can be formed with respect to a second plane perpendicular to the central axis at an end of the mirror opposite the point of intersection between the central axis and the mirror.

Once a two-dimensional mirror profile is developed with an angle B chosen, as shown in FIG. 10, an angle D can be formed, shown in FIG. 11 as 30, with respect to a second plane perpendicular to the central axis 10 at an end of the mirror 6 opposite the point of intersection between the central axis and the mirror. This angle D is dependant upon angle A, which defines the lower limit of the controlled vertical field of view, and angle B, which defines the upper limit of the controlled vertical field of view. Equation (6) shows the relationship between angle D, angle A, and angle B as:

$$D = ((B-A)/\alpha + B)/2 \quad (6)$$

Angle D ranges from about 50° to about 100°, preferably from about 65° to about 90°, more preferably from about 70° to about 85°. In a particular embodiment, angle D is about 76°.

In practice, a panoramic mirror with a controlled vertical field of view may be formed by generating a two-dimensional profile of such a mirror with the selected angle A, as depicted in FIG. 7B, choosing an appropriate value for B, a shown in FIG. 10, and then rotating the resulting two-dimensional profile around the axis of rotation to form a surface of revolution.

In an embodiment of the invention, A is chosen to be 10°, B is chosen to be 140°, and α is chosen to be 11. Substituting these values in equation (5), and solving the equation numerically, a unique mirror shape is produced with an angle C of about 5° and an angle 1 of about 76°. This unique mirror shape reflects panoramic images with a resolution unparalleled in the prior art. This superior resolution is obtained from a combination of the compensated equi-angular properties of the panoramic mirror, and the fact that the resolution has been further optimized by controlling the appropriate vertical field of view for the mirror. In this embodiment, the primary concern is providing a high-resolution viewable panoramic image, not eliminating central obscurations from the viewable panoramic image.

Figure 12:
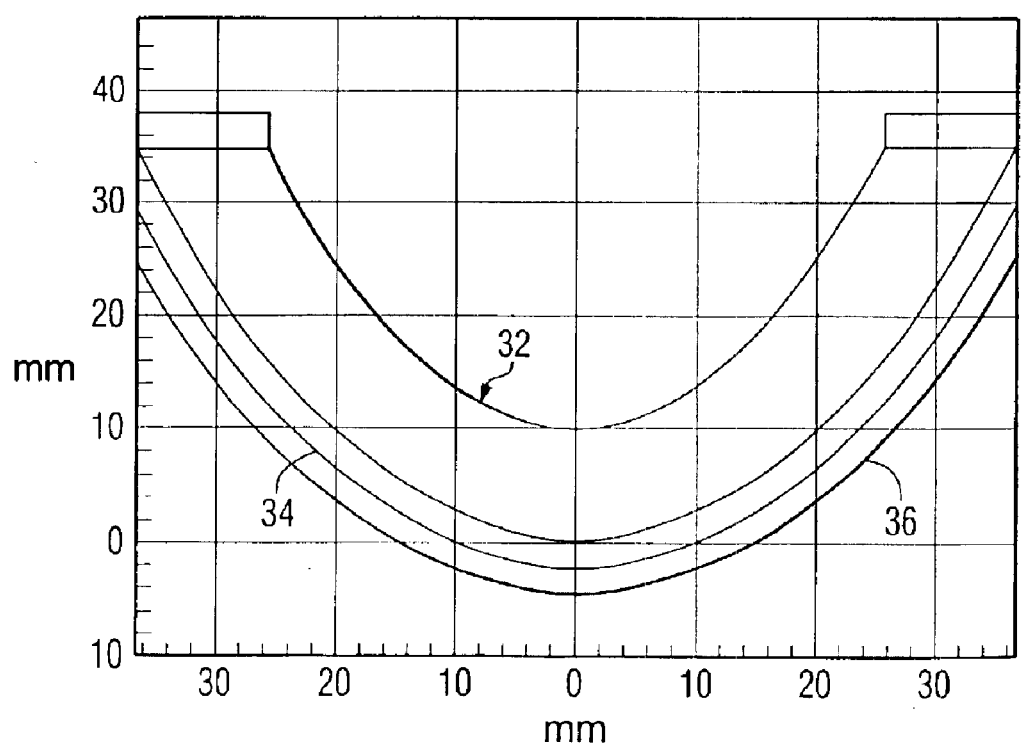
FIG. 12 shows a cross-sectional view of a compensated equi-angular mirror with a controlled vertical field of view, in accordance with an embodiment of the present invention.

FIG. 12 shows a cross-sectional view of the resulting mirror shape. In a preferred embodiment, the panoramic mirror comprises a substrate 32 made of PYREX glass coated with a reflective surface 34 made of aluminum, and with a silicon protective coating 36. In this embodiment, the smoothness of the mirror is ¼ of the wavelength of visible light.

As shown in FIG. 7A, angle A defines half of the conical portion to be removed from the convex reflective mirror. Angle A also corresponds to the lower limit desired for the controlled vertical field of view. As shown in FIG. 10, angle B corresponds to the upper limit desired for the controlled vertical field of view. In a preferred embodiment, angle A is chosen so as to eliminate the entire lower portion of the viewable panoramic image that the viewer is not interested in seeing, and angle B would be chosen so as to eliminate the entire upper portion of the viewable panoramic image that the viewer is not interested in seeing. For example, if a viewer is not interested in viewing any portion of the viewable panoramic image below 40°, then it may be ideal to remove a 40° piece of the mirror from either side of the central axis. Likewise, if a viewer is not interested in viewing any portion of the viewable panoramic image above 140°, then it may be ideal to select the upper limit of the controlled vertical field of view to be 140°. This could direct the maximum amount of available resolution to the portion of the viewable panoramic image that the viewer is interested in viewing. Although this might be considered the ideal situation, there are other resolution constraints that should be considered when designing a panoramic mirror with a controlled vertical field of view. While these resolution constraints may not significantly affect the desired upper controlled vertical field of view limit, this often means that the desired lower portion of the panoramic image to be eliminated from the raw 360° image and the viewable panoramic image may not correspond exactly to the section of the panoramic mirror 2A that would be removed and the lower limit of the controlled vertical field of view angle A that would result under the "ideal" scenario described above.

This concept may be illustrated by considering the extreme cases: the situation where a panoramic mirror is designed without a controlled vertical field of view at all; and the situation where a panoramic mirror is designed with a controlled vertical field of view that completely eliminates all of the unwanted portions of the panoramic image from the resulting panoramic image.

Figures 13A, 13B:
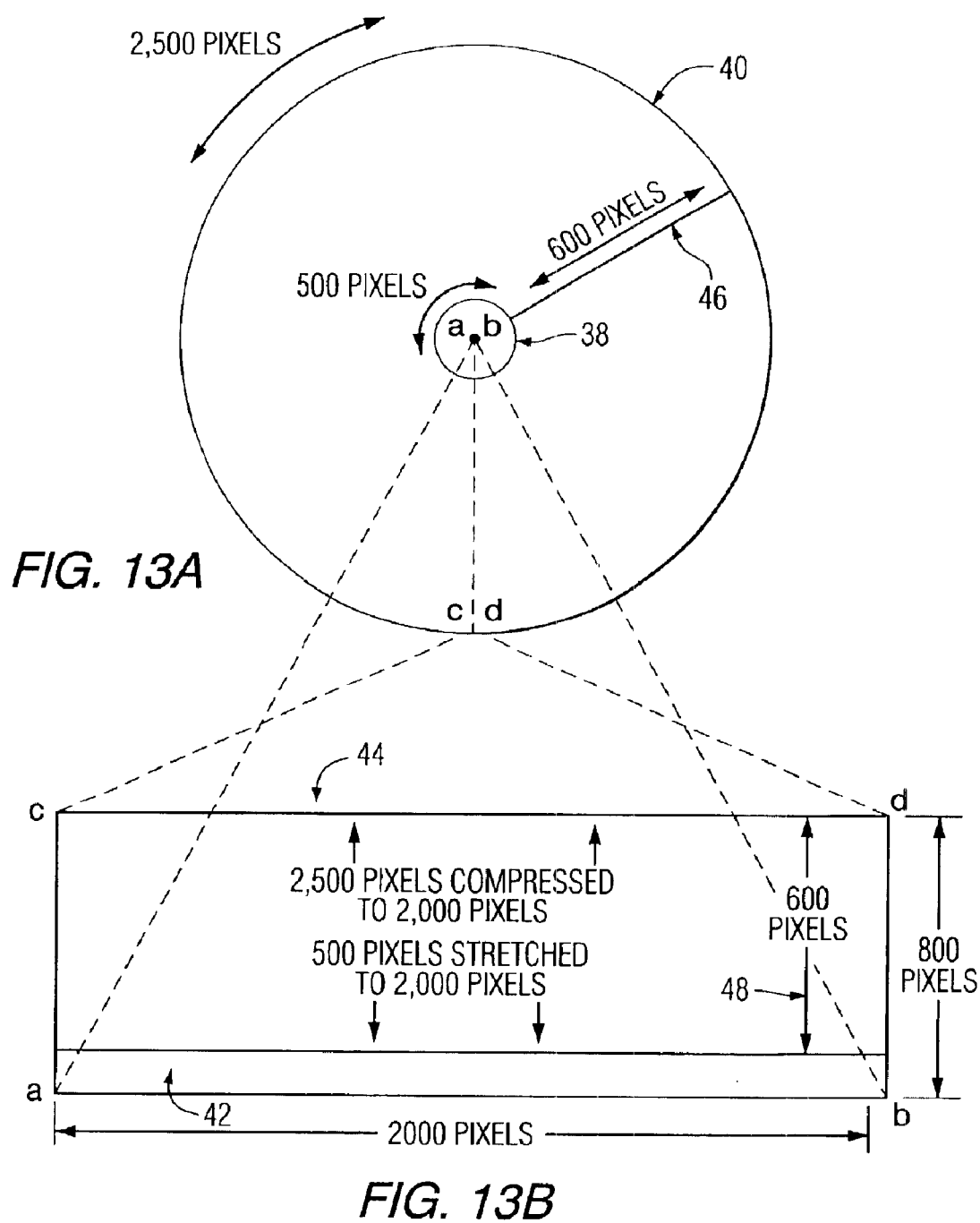
FIG. 13A shows a schematic representation of a raw 360° image
FIG. 13B shows a schematic representation of a raw 360° image unwarped into a viewable panoramic image.

FIG. 13A shows a schematic representation of a raw 360° image, and FIG. 13B shows a schematic representation of a raw 360° image unwarped into a viewable panoramic image. In this example, the viewable panoramic image has a fixed available resolution of 2000 pixels by 800 pixels, as shown in FIG. 13B. By matching up a, b, c, and d in the raw 360° image with a, b, c, and d in the unwarped viewable panoramic image, it can be seen that when the raw 360° image is unwarped, points a and b in the raw 360° image get stretched to form the bottom of the viewable panoramic image, and points c and d in the raw 360° image get compressed to from the top of the viewable panoramic image.

In the raw 360° image, pixels can be defined and represented in several ways. As used herein, the term "horizontal pixel circumference" is used to define the number of pixels that lie on the circumference of an imaginary circle drawn at any given point in the raw 360° image. By referring to FIG. 13A, it can be seen that the horizontal pixel circumference is small on a circle 38 drawn closer to the center of the raw 360° image, and that the horizontal pixel circumference is largest on a circle 40 corresponding to the outer edge of the raw 360° image. The horizontal pixel circumference in the raw 360° image corresponds to the horizontal resolution in the viewable panoramic image. In other words, a circle with a given horizontal pixel circumference will correspond to a particular horizontal line in the viewable panoramic image. Circles drawn near the center of the raw 360° image will correspond to horizontal lines towards the bottom of the viewable panoramic image, and circles drawn towards the outer edge of the raw 360° image will correspond to horizontal lines drawn towards the top of the viewable panoramic image.

As already noted, the horizontal pixel circumference will be small on circles drawn towards the center of the raw 360° image, and portions of the raw 360° image towards the center of the raw 360° image will be stretched horizontally when the raw 360° image is unwarped. Therefore, for example, if the horizontal pixel circumference of circle 38 drawn near the center of the raw 360° image is 500 pixels, these 500 pixels must be stretched to fill the space of 2,000 pixels when the raw 360° image is unwarped. Therefore the horizontal resolution of the viewable panoramic image at 42, corresponding to circle 38, will have a resolution of 500 pixels stretched to fill the space of 2,000 pixels.

As already noted, the horizontal pixel circumference of circles drawn towards the outer edge of the raw 360° image will be large, and portions of the raw 360° image towards the outer edge of the raw 360° image will be compressed horizontally when the raw 360° image is unwarped. Therefore, for example, if the very outer circumference 40 of the raw 360° image has a horizontal pixel circumference of 2,500 pixels, these 2,500 pixels will be compressed horizontally to fill the space of 2,000 pixels when the raw 360° image is unwarped. Therefore the horizontal resolution of the viewable panoramic image at 44, corresponding to circle 40, will have a resolution of 2,500 pixels compressed to fill the space of 2,000 pixels.

The trend here is that portions of the viewable panoramic image towards the bottom of viewable panoramic image will have poor horizontal resolution, while portions of the viewable panoramic image towards the top of the viewable panoramic image will have significantly better horizontal resolution. As can be seen, the horizontal resolution of the viewable panoramic image improves as one moves from the bottom of the viewable panoramic image towards the top of the viewable panoramic image. An example of an extreme case is the point at the very center of the raw 360° image. This point corresponds to a horizontal pixel circumference of 1, meaning that this 1 pixel will be stretched to fill the space of 2,000 pixels at the very bottom of the viewable panoramic image.

As used herein, the term "vertical pixel radius" is used to define the number of pixels that lie on an imaginary straight line anywhere on the raw 360° image, of any length, drawn perpendicular to the outer edge of the raw 360° image. An example of a line 46 with a particular vertical pixel radius is shown in FIG. 13A. For example, assume that the vertical pixel radius of line 46 is 600 pixels. The imaginary line drawn with the vertical pixel radius does not shrink or expand as the raw 360° image is unwarped into a viewable panoramic image, Therefore, when the raw 360° image is unwarped, the vertical pixel radius of 600 pixels will fill 600 of the available 800 pixels in the vertical direction of the viewable panoramic image, as shown in 48, and there will be a constant vertical resolution across the entire viewable panoramic image.

Figures 14A, 14B:
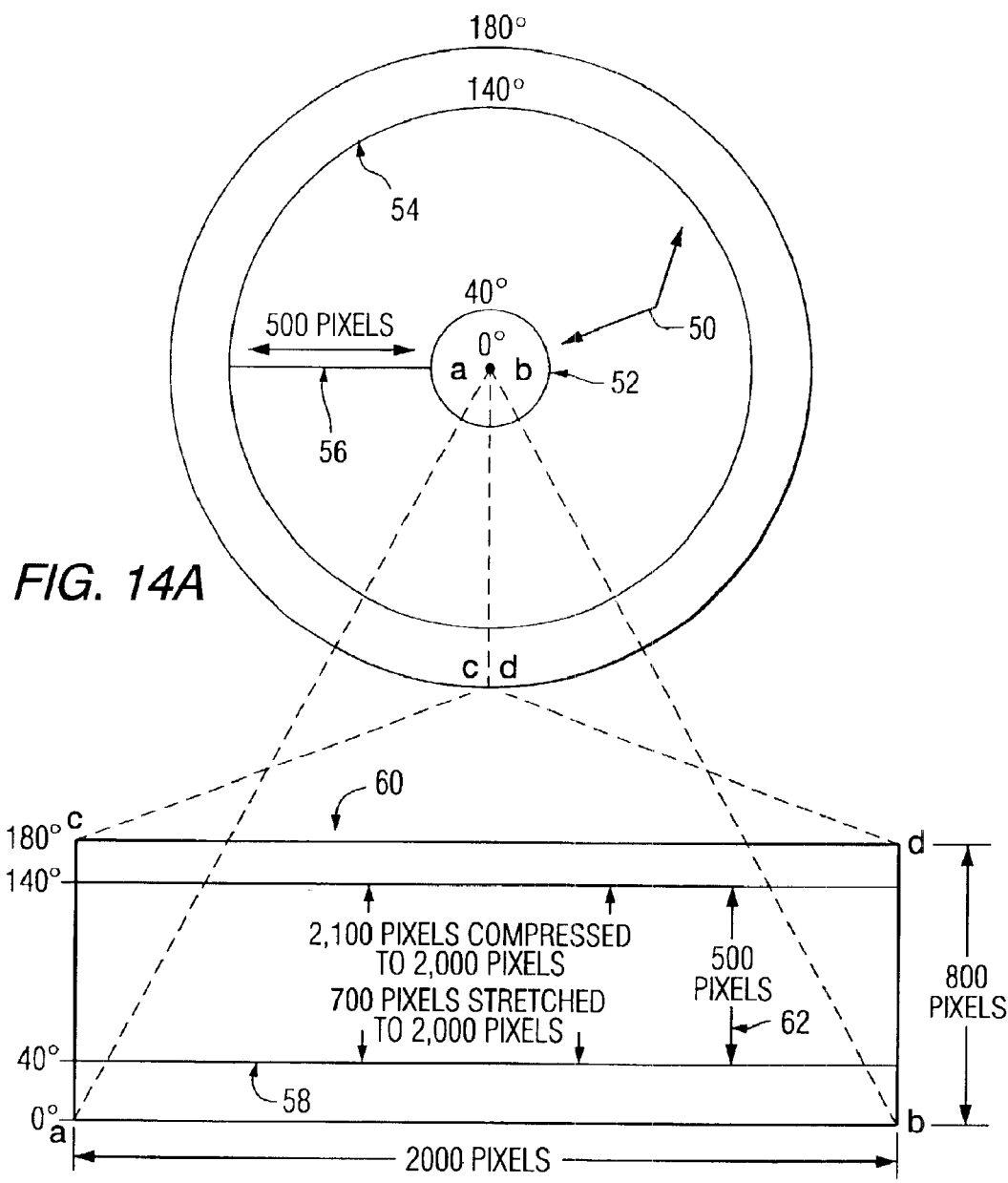
FIG. 14A shows a schematic representation of a raw 360° image captured with a panoramic mirror designed without a controlled vertical field of view
FIG. 14B shows a schematic representation of the raw 360° image of FIG. 10A unwarped into a viewable panoramic image.

The situation where a panoramic mirror is designed without a controlled vertical field of view is examined first. FIG. 14A shows a schematic representation of a raw 360° panoramic image captured with a panoramic mirror designed without a controlled vertical field of view, and FIG. 14B shows a schematic representation of this raw 360° image unwarped into a viewable panoramic image. In this example, the viewable panoramic image has a fixed available resolution of 2,000 pixels by 800 pixels, as shown in FIG. 14B. Assume in this case that the viewer is interested only in the portion of the panoramic image that lies between 40° and 140° in the vertical direction. This desired vertical field of view is marked as 50 in FIG. 14A. In this example, the horizontal pixel circumference 52 at the 40° mark is 700 pixels and the horizontal pixel circumference 54 at the 140° mark is 2,100 pixels. The vertical pixel radius 56 of the desired vertical field of view is 500 pixels. In this case, when the raw 360° image is unwarped, the horizontal pixel circumference 52 of 700 pixels will be stretched to fill the space of 2,000 pixels in the viewable panoramic image, shown at 58, and the horizontal pixel circumference 54 of 2,100 pixels will be compressed to fill the space of 2,000 pixels in the viewable panoramic image, shown at 60. The vertical pixel radius 56 of 500 pixels will translate to the part of the viewable panoramic image that the viewer is interested in looking at, and will occupy 500 of the available 800 pixels in the vertical direction, shown at 62.

In this situation it is clear that resolution is being wasted on unwanted portions of the panoramic image in both the horizontal and the vertical direction. In the vertical direction, three hundred pixels are being wasted on portions of the panoramic image that the viewer is not interested in seeing. With regard to the horizontal resolution, while it is true that the top of the portion of the panoramic image that the viewer is interested in viewing has a good horizontal resolution, the portion of the panoramic image above this, i.e., portion from one 140° to 180°, is enjoying an even more superior horizontal resolution. This superior horizontal resolution is being wasted on a part of the panoramic image the viewer is not interested in seeing.

The bottom of the viewable panoramic image appears to be a problematic area. The bottom of the portion of the viewable panoramic image that the viewer is interested in has a horizontal pixel circumference of 700 pixels spread out over a 2,000 pixel area, which in theory is not a very good horizontal resolution. Furthermore, the area below the bottom of the portion of the viewable panoramic image that the user is interested in, i.e., the area from 0° to 40°, suffers from an even poorer horizontal resolution, with the horizontal resolution at the 0° mark being 1 pixel spread out over the area of 2,000 pixels. Fortunately, inherent in panoramic imaging is the fact that unwanted images usually lie at the bottom of the viewable panoramic image such as the camera, the camera lens, the mount holding the mirror in front of the camera, and other unwanted foreground images. Furthermore, even though portions of the panoramic image that appear within the viewable panoramic image at the 40° mark suffer from a poorer horizontal resolution, and these may be portions of the viewable panoramic image that the viewer is interested in seeing, these portions of the resulting panoramic image are usually relatively close to the camera lens, which greatly decreases the effect that the poorer horizontal resolution has towards the bottom of the viewable panoramic image.

Figures 15A, 15B:
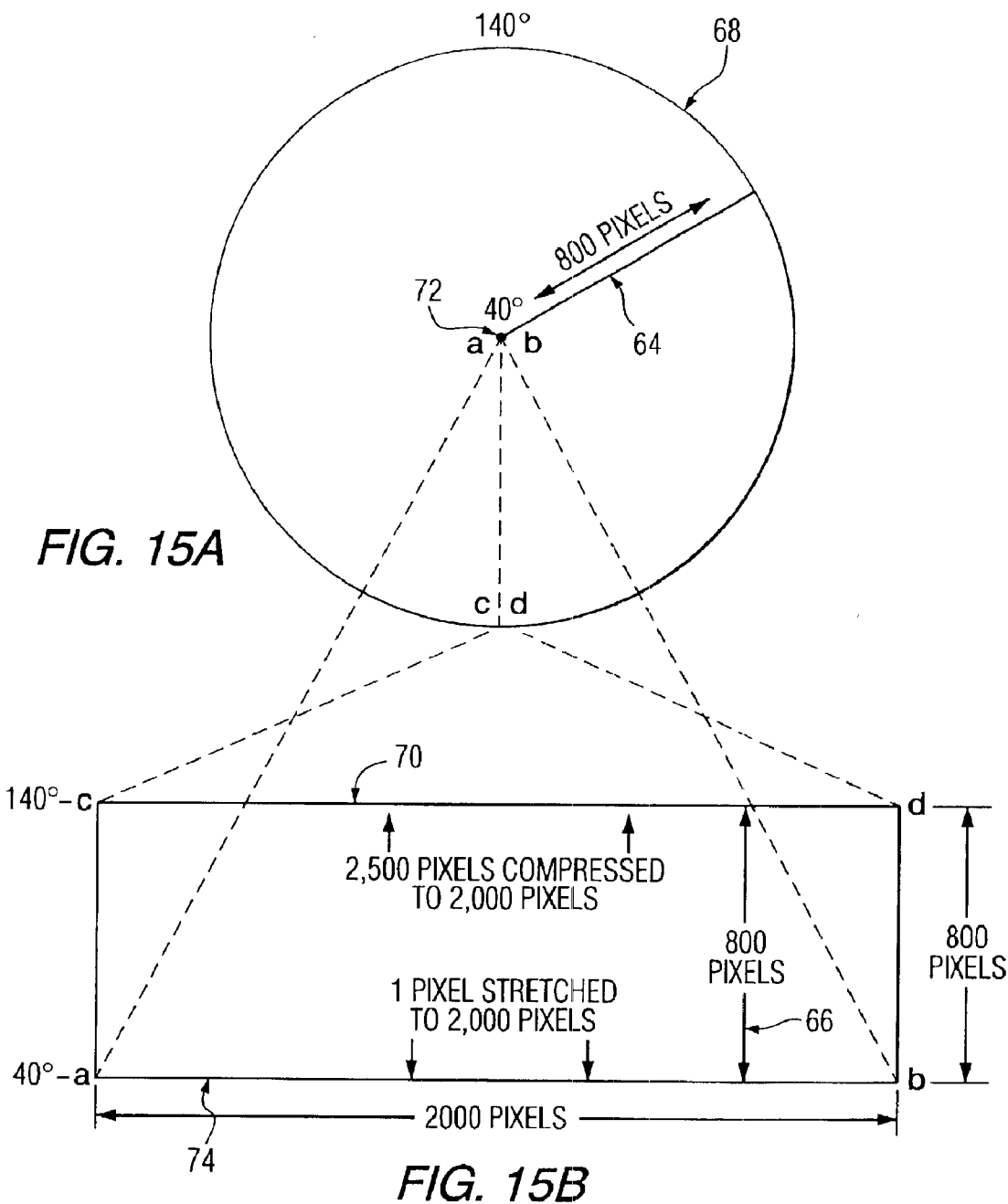
FIG. 15A shows a schematic representation of a raw 360° image taken with a panoramic mirror designed with a controlled vertical field of view from 40° to 140°.
FIG. 15B shows a schematic representation of the raw 360° image of FIG. 1A unwarped into a viewable panoramic image.

Based on the foregoing, it appears that a solution would be to design a panoramic mirror with a controlled vertical field of view that images only the portion of the panorama that the user is interested in viewing. FIG. 15A shows a schematic representation of a raw 360° panoramic image taken with a panoramic mirror designed with a controlled vertical field of view from 40° to 140°, and FIG. 15B shows a schematic representation of this raw 360° image unwarped into a viewable panoramic image. In this example, the viewable panoramic image has a fixed available resolution of 2,000 pixels by 800 pixels, as shown in FIG. 15B. In this case, the vertical pixel radius 64 is 800 pixels. When this raw image is unwarped, the vertical pixel radius of 800 pixels will cover the entire 800 pixels in the viewable panoramic image, thereby not wasting any vertical resolution on unwanted portions of the panoramic image, as shown at 66.

Turning to the horizontal resolution, the horizontal pixel circumference 68 at the outer edge of the raw 360° image, i.e., the 140° mark, is 2,500 pixels. When this raw 360° image is unwarped, the horizontal pixel circumference of 2,500 pixels will be compressed to an available horizontal resolution of 2,000 pixels, thereby giving the top of the portion of the viewable panoramic image the viewer is interested in a maximum horizontal resolution, as shown in 70.

In this case, however, a problem arises at the bottom of the viewable panoramic image. Since the panoramic mirror was designed with a controlled field of view which reflects a panoramic image starting only at 40° in the vertical direction, this 40° mark occurs at the tip of the panoramic mirror, which corresponds to the point 72 at the center of the raw 360° image shown in FIG. 15A. Therefore, the horizontal pixel circumference 64 at the 40° mark is equal to 1 pixel, and this single pixel must be spread out over the space of the 2,000 available pixels when the raw 360° image is unwarped into a viewable panoramic image, as shown in 74. This is a portion of the panoramic image that the viewer is interested in seeing, but this portion of the viewable panoramic image will appear as a single line of a solid color because of the poor horizontal resolution and the fact that 1 pixel is being stretched into the space of 2,000 pixels.

These examples of the two extremes show that a compromise should be made. Completely eliminating all unwanted portions of the panoramic image from the viewable panoramic image may not present the portion of the panoramic image that the viewer is interested in viewing with the best possible resolution. Therefore, a balance must be struck between eliminating unwanted portions of the panoramic image from the resulting viewable panoramic image, and providing the best possible resolution for the portion of the panoramic image that the viewer is interested in seeing. This compromise may be achieved by balancing the vertical pixel radius, the horizontal pixel circumference at the upper limit of the desired vertical field of view, i.e. the upper limit of the portion of the viewable panoramic image that the viewer is interested in viewing, and the horizontal pixel circumference at the lower limit of the desired vertical field of view, i.e. the lower limit of the portion of the viewable panoramic image that the viewer is interested in viewing.

Figures 16A, 16B:
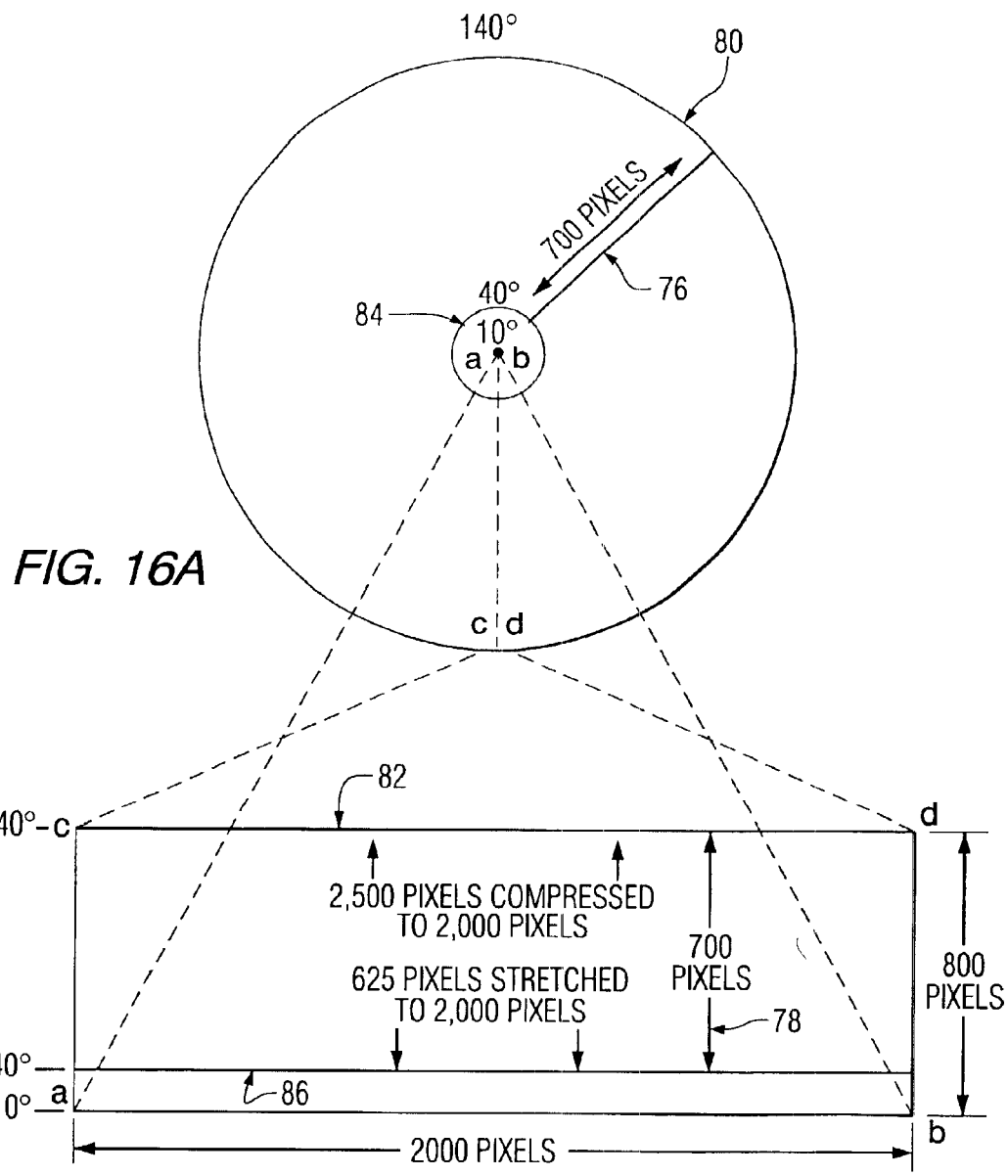
FIG. 16A shows a schematic representation of a raw 360° image taken with a panoramic mirror designed with a controlled vertical field of from 100 to 140°.
FIG. 16B shows a schematic representation of the raw 360° image of FIG. 12A unwarped into a viewable panoramic image.

FIG. 16A and FIG. 16B depict such a compromise. In this case, a panoramic mirror with a controlled vertical field of view is used with a lower vertical field of view limit of 10° and an upper vertical field of view limit of 140°. FIG. 16A shows a schematic representation of a raw 360° image captured with such a panoramic mirror, and FIG. 16B shows a schematic representation of this raw 360° image unwarped into a viewable panoramic image. As shown in FIG. 16A, the vertical pixel radius 76 of the portion of the panoramic image the viewer is interested in seeing is 700 pixels. When this raw 360° image is unwarped, this vertical pixel radius of 700 pixels translates to fill 700 of the 800 available vertical pixels in the viewable panoramic image, as shown at 78 in FIG. 16B. This represents only a loss of 100 pixels in the vertical direction.

As shown in FIG. 16A, the horizontal pixel circumference at the outer edge 80 of the raw 360° image, i.e., at 140°, is 2,500 pixels. When the raw 360° image is unwarped into a viewable panoramic image, these 2,500 pixels get compressed at the top of the viewable panoramic image into the available 2,000 pixels, as shown at 82 in FIG. 16B. This gives the maximum horizontal resolution at the top of the portion of the panoramic image that the viewer is interested in viewing.

As shown in FIG. 16A, the horizontal pixel circumference 84 at the 40° mark is 625 pixels. In this case, when the raw 360° image is unwarped into a viewable panoramic image, these 625 pixels will be stretched to fill the available 2,000 pixels at the bottom of the portion of the viewable panoramic image that the user is interested in seeing, as shown at 86 in FIG. 16B.

In this case, as compared to a panoramic mirror designed without a controlled field of view, only 75 pixels have been lost at the bottom of the portion of the panoramic image that the viewer is interested in seeing, while the horizontal resolution at the top of the portion of the panoramic image that the viewer is interested in seeing has been increased by 400 pixels and the overall vertical resolution of the portion of the panorama that the viewer is interested in seeing has been increased by 200 pixels.

These examples illustrate that in order to provide the portion of the viewable panoramic image that the user is most interested in seeing at the best resolution possible, all of the unwanted portions of the viewable panoramic image may not be fully eliminated. These unwanted portions may include, for example, the camera, the camera mount, the camera lens, the mount holding the mirror in front of the camera and other unwanted foreground images. In this embodiment, the vertical field of view of the viewable panoramic image that the viewer wishes to see is 40° to 140°, while the controlled vertical field of view of the viewable panoramic image is 10to 140°. As used herein the term "desired vertical field of view" means the vertical field of view corresponding to the portion of the viewable panoramic image that the viewer is interested in viewing. The desired vertical field of view may be equal to or less than the controlled vertical field of view. The desired vertical field of view may range from about 2° to about 170°, preferably from about 15° to about 150°. A particularly preferred desired vertical field of view that a viewer would typically be interested in viewing ranges from about 40° to about 140°.

Figure 17:
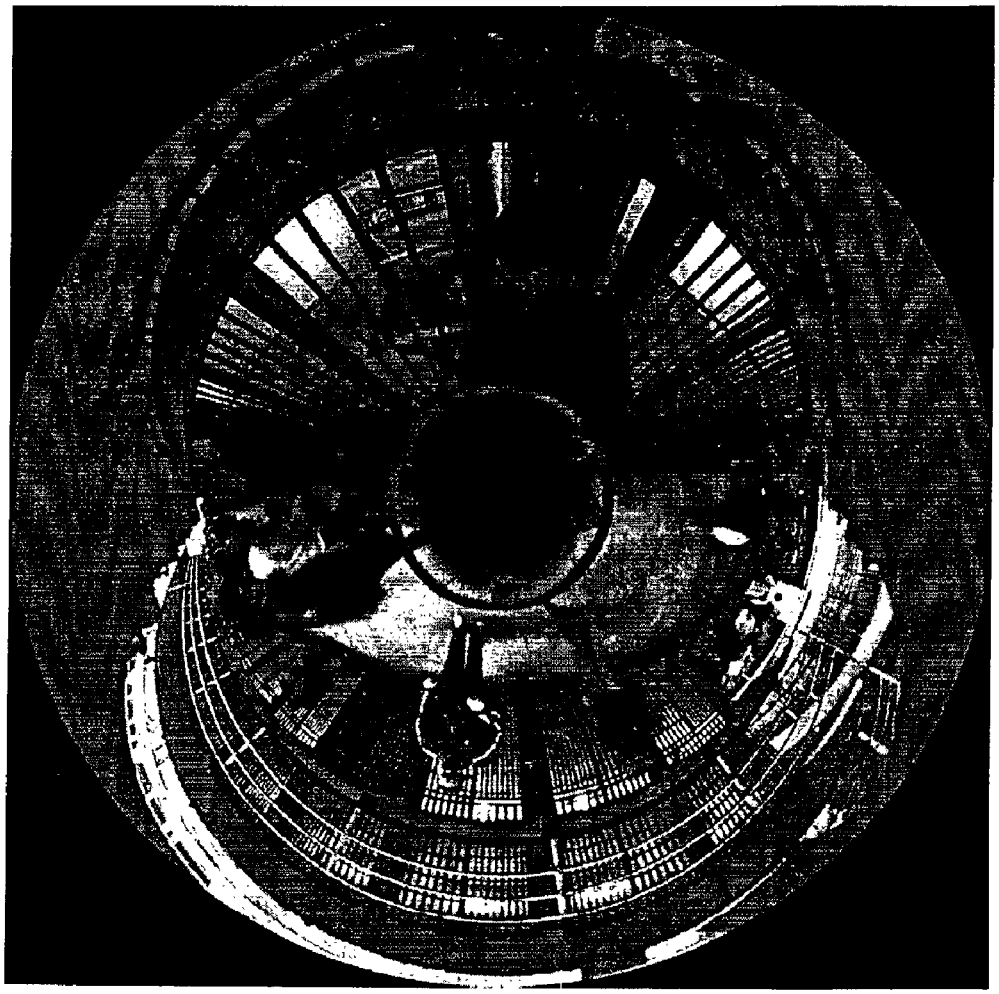
FIG. 17 shows a raw 360° image captured with a panoramic mirror with a controlled vertical field of view, where the lower vertical field of view limit is controlled to be 10° and the upper vertical field of view limit is controlled to be 140°, in accordance with an embodiment of the present invention.
Figure 18:
FIG. 18 shows the raw 360° image of FIG. 17 unwarped into a viewable panoramic image, and illustrates that a portion of the camera mount appears in the viewable panoramic image, in accordance with an embodiment of the present invention.

FIG. 17 shows a raw 360° image captured with a panoramic mirror with a controlled vertical field of view, where the lower controlled vertical field of view limit is controlled to be 10° and the upper controlled vertical field of view limit is controlled to be 140°. FIG. 18 shows this raw 360° image unwarped into a viewable panoramic image. FIG. 18 shows that the viewable panoramic image has a high-quality resolution that appears constant throughout the image in the horizontal and vertical directions. However, FIG. 18 also shows that some unwanted portions of the panoramic image still appear in the viewable panoramic image, such as a portion of the mirror mount 88.

Initially, an optimum controlled vertical field of view was chosen by considering the vertical field of view that would be required for a particular application, and the resolution that would be required for that application. As an example, a compensated equi-angular mirror was formed with an upper controlled vertical field of view limit of about 120° and a lower controlled vertical field of view limit of 0°. Low alpha values of 3, and then 5, were chosen, and the mirror was placed at about 30 cm from the camera lens. In this example, the resulting resolution of the portion of the viewable panoramic image that was interesting was acceptable, but a large portion of the viewable panoramic image was lost when the raw 360° image was formatted so that it would fill the entire frame of the viewable panoramic image.

As another example, a compensated equi-angular mirror was formed with an upper controlled vertical field of view limit of about 160° and a lower controlled vertical field of view limit of about 10°. An alpha value of 7 was chosen, and the mirror was placed at about 6 cm from the camera lens. In this example, the resulting resolution of the portion of the viewable panoramic image that was interesting was poor.

As another example, a compensated equi-angular mirror was formed with an upper controlled vertical field of view limit of about 140° and a lower controlled vertical field of view limit of about 10°. An alpha value of 11 was chosen, and the mirror was placed at about 11 cm from the camera lens. In this example, the resulting resolution of the portion of the viewable panoramic image that was interesting was good for most objects that a viewer would most ordinarily be interested in, and almost the entire image from the mirror filled the frame of the viewable panoramic image.

Figure 19:
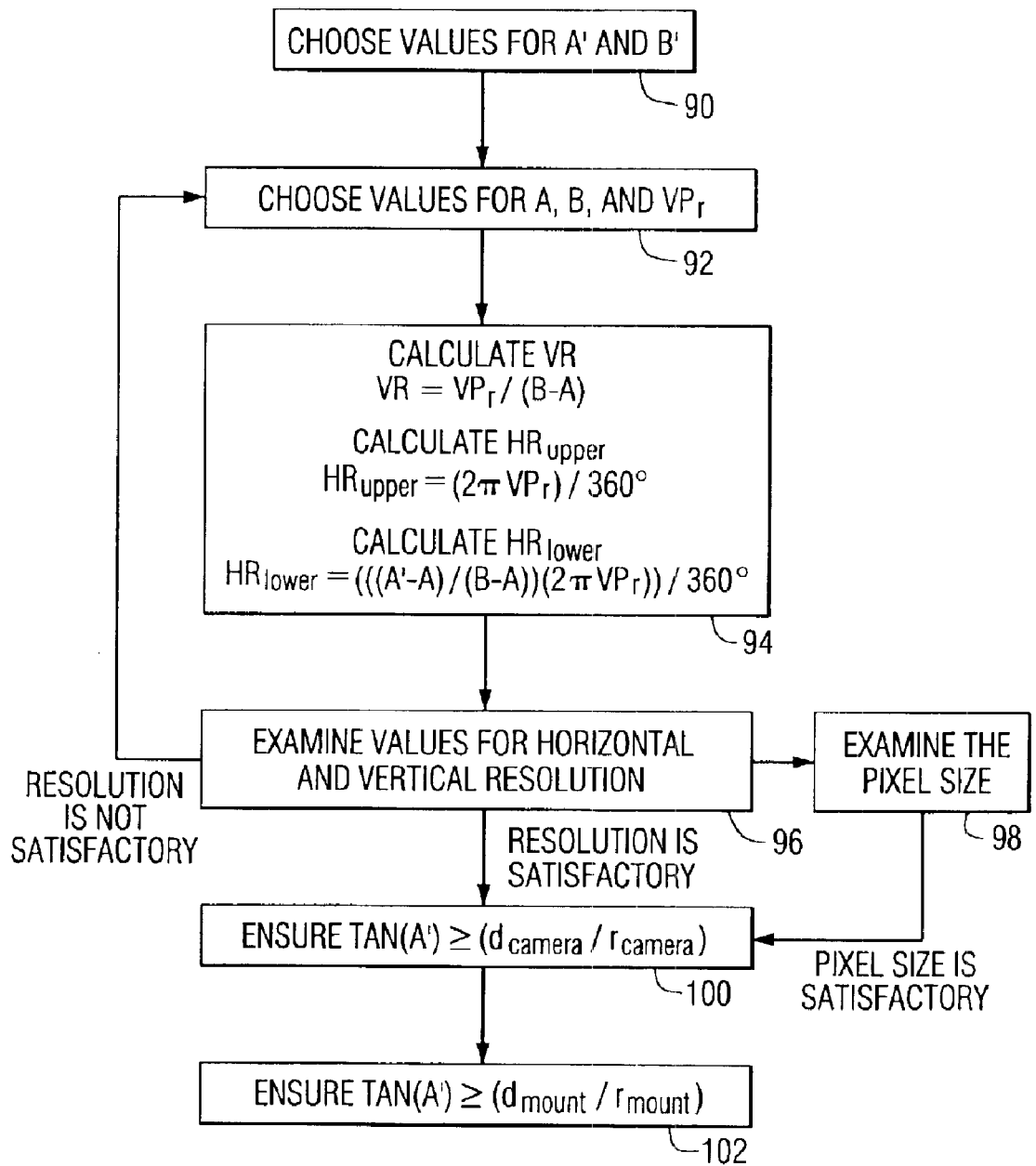
FIG. 19 shows a flow diagram for designing a compensated equi-angular mirror with a controlled vertical field of view to reflect panoramic images with an optimal resolution.

FIG. 19 shows a method for designing a compensated equi-angular mirror with a controlled vertical field of view to reflect panoramic images with an optimal resolution.

In one embodiment, an initial assumption is made that a compensated equi-angular mirror with a particular controlled vertical field of view is being used.

In step 1, shown in box 90, particular values are chosen for the lower limit of the desired vertical field of view, A', and the upper limit of the desired vertical field of view, B'.

In step 2, shown in box 92, candidate values are chosen for the lower limit of the controlled vertical field of view, A, and the upper limit of the controlled vertical field of view, B, and the value is supplied for the vertical pixel radius $VP_r$ between A and B.

In Step 3, shown in box 94, the vertical resolution VR of the viewable panoramic image within the desired vertical field of view is calculated in pixels per degree, which remains constant throughout the image, the horizontal resolution at the upper limit of the desired vertical field of view $HR_{upper}$ is calculated in pixels per degree, and the horizontal resolution at the lower limit of the desired vertical field of view $HR_{lower}$ is calculated in pixels per degree.

In Step 4, shown in box 96, the values obtained for the horizontal and vertical resolution for the desired vertical field of view are examined. If the values are satisfactory, Step 5 may be performed, as indicated at box 100. If the values are not satisfactory, then Step 2 is repeated and different values are chosen for the lower limit of the controlled vertical field of view, A, and the upper limit of the controlled vertical field of view, B, and the value of the vertical pixel radius $VP_r$ between A and B.

Alternatively, the step shown in box 98 may be performed once satisfactory values have been obtained for the vertical and horizontal resolution, so that these values may be checked to determine if the resulting pixel size is satisfactory for the particular object that the viewer desires to see. For example, if the viewer is interested in viewing a human face, the pixel size would need to be small enough to show, at least in some detail, objects such as the eyes of the face. The distance that the camera is placed from the ground and the distance that the object of interest is located from the panoramic mirror are parameters that can be used to determine the pixel size.

Once an optimal controlled vertical field of view has been chosen, steps must be taken to ensure that portions of the resulting viewable panoramic image within the desired vertical field of view are re not obscured by parts of the camera and/or the mirror mounting device.

Step 5, as shown in box 100, ensures that the image of the camera will not obscure the resulting viewable panoramic image within the desired vertical field of view. In Step 5, a value is supplied for the distance the panoramic mirror is placed from the camera, $r_{camera}$, and a value is supplied for the distance from the axis of the camera to the furthest edge of the camera, $d_{camera}$. Then, the relationship shown in box 100 is evaluated, and $r_{camera}$ is adjusted until the image of the camera does not obscure the resulting viewable panoramic image within the desired vertical field of view.

Step 6, as shown in box 102, ensures that the image of the mirror mount will not obscure the resulting viewable panoramic image within the desired vertical field of view. In Step 6, a value is supplied for the distance the panoramic mirror is placed from the widest portion of the mirror mount, $r_{mount}$, and a value is supplied for the distance from the axis of the camera to the edge of the widest portion of the mirror mount, $d_{mount}$. Then, the relationship shown in box 102 is evaluated, and $r_{mount}$ is adjusted until the image of the mirror mount does not obscure the resulting viewable panoramic image within the desired vertical field of view.

In this embodiment, as far as a compensated equi-angular mirror is concerned, all other parameters remaining constant, the resulting horizontal and vertical resolution of the viewable panoramic image within the desired vertical field of view would be greater if a compensated equi-angular mirror is used and the resulting horizontal and vertical resolution of the viewable panoramic image within the desired vertical field of view would be less if a compensated equi-angular mirror is not used In this embodiment, as far as a controlled vertical field of view is concerned, all other parameters remaining constant, the resulting horizontal and vertical resolution of the viewable panoramic image within the desired vertical field of view would be greater if a controlled vertical field of view is used and the resulting horizontal and vertical resolution of the viewable panoramic image within the desired vertical field of view would be less if a controlled vertical field of view is not used In FIG. 19, as far as A is concerned, all other parameters remaining constant, the resulting vertical resolution of the viewable panoramic image within the desired vertical field of view would be less for greater values of A and the resulting vertical resolution of the viewable panoramic image within the desired vertical field of view would be greater for smaller values of A.

In FIG. 19, as far as A is concerned, all other parameters remaining constant, the resulting horizontal resolution of the viewable panoramic image within the desired vertical field of view would be greater for greater values of A and the resulting horizontal resolution of the viewable panoramic image within the desired vertical field of view would be less for smaller values of A.

In FIG. 19, as far as B is concerned, all other parameters remaining constant, the resulting vertical resolution of the viewable panoramic image within the desired vertical field of view would be greater for greater values of B and the resulting vertical resolution of the viewable panoramic image within the desired vertical field of view would be less for smaller values of B.

In FIG. 19, as far as B is concerned, all other parameters remaining constant, the resulting horizontal resolution of the viewable panoramic image within the desired vertical field of view would be less for greater values of B and the resulting horizontal resolution of the viewable panoramic image within the desired vertical field of view would be greater for smaller values of B.

In FIG. 19, as far as $VP_r$ is concerned, all other parameters remaining constant, the resulting vertical resolution of the viewable panoramic image within the desired vertical field of view would be greater for greater values of $VP_r$ and the resulting vertical resolution of the viewable panoramic image within the desired vertical field of view would be less for smaller values of $VP_r$.

In FIG. 19, as far as $VP_r$ is concerned, all other parameters remaining constant, the resulting horizontal resolution of the viewable panoramic image within the desired vertical field of view would be greater for greater values of $VP_r$ and the resulting horizontal resolution of the viewable panoramic image within the desired vertical field of view would be less for smaller values of $VP_r$.

In FIG. 19, as far as $r_{camera}$ is concerned, all other parameters remaining constant, the obstruction of the camera blocking the portion of the viewable panoramic image within the desired vertical field of view would be less for greater values of $r_{camera}$ and the resulting obstruction of the camera blocking the portion of the viewable panoramic image within the desired vertical field of view would be greater for smaller values of $r_{camera}$.

In FIG. 19, as far as $d_{camera}$ is concerned, all other parameters remaining constant, the obstruction of the camera blocking the portion of the viewable panoramic image within the desired vertical field of view would be greater for greater values of $d_{camera}$ and the resulting obstruction of the camera blocking the portion of the viewable panoramic image within the desired vertical field of view would be less for smaller values of $d_{camera}$.

In FIG. 19, as far as $r_{mount}$ is concerned, all other parameters remaining constant, the obstruction of the mirror mount blocking the portion of the viewable panoramic image within the desired vertical field of view would be less for greater values of $r_{mount}$ and the resulting obstruction of the mirror mount blocking the portion of the viewable panoramic image within the desired vertical field of view would be greater for smaller values of $r_{mount}$.

In FIG. 19, as far as $d_{mount}$ is concerned, all other parameters remaining constant, the obstruction of the mirror mount blocking the portion of the viewable panoramic image within the desired vertical field of view would be greater for greater values of $d_{mount}$ and the resulting obstruction of the mirror mount blocking the portion of the viewable panoramic image within the desired vertical field of view would be less for smaller values of $d_{mount}$.

In an embodiment, utilizing the process outlined in FIG. 19, a compensated equi-angular mirror with a desired vertical field of view having a lower limit A' of about 40° and an upper limit B' of about 140° is designed with a controlled vertical field of view having an angle A equal to about 10° and an angle B equal to about 140°, a $VP_r$ of about 1,000 pixels, and an α equal to about 11. The mirror is placed at a distance $r_{camera}$ from the camera of about 12 cm, and is placed on a mounting device with a $d_{mount}$ of about 4.25 cm. The mirror is placed at a distance $r_{mount}$ from the widest portion of the mirror mount of about 4.7 cm. In this embodiment, the mirror is mounted in front of a camera sold under the designation NIKON 990 by NIKON, or a camera sold under the designation NIKON 995 by NIKON, with a $d_{camera}$ of about 10.2 cm. In this embodiment, a unique mirror shape is produced with an angle C of about 5° and an angle D of about 76°. This unique mirror shape reflects panoramic images with a resolution unparalleled in the prior art. This superior resolution is obtained from a combination of the compensated equi-angular properties of the panoramic mirror, and the fact that the resolution has been further optimized by controlling the appropriate vertical field of view for the mirror. In this embodiment, the primary concern is providing a high-resolution viewable panoramic image, not eliminating central obscurations from the viewable panoramic image.

Figure 20:
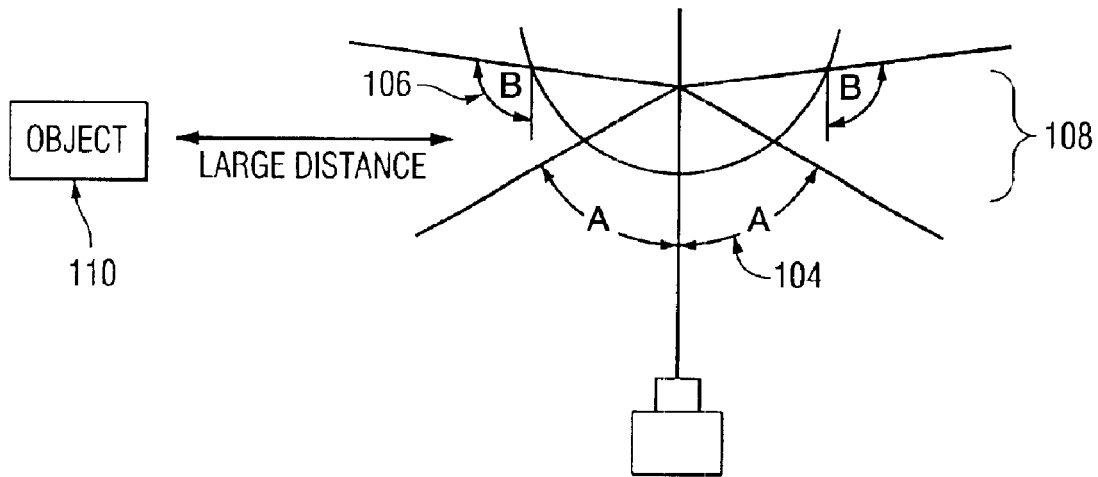
FIG. 20 shows how the vertical field of view can be controlled when the desired field of view may be mostly orthogonal to the optical axis of the camera, in accordance with an embodiment of the present invention.

Although an embodiment of the present invention provides a controlled vertical field of view from about 10° to about 140°, which in turn provides a viewer with a high resolution viewable panoramic image, there may be some instances when the desired vertical field of view may be mostly orthogonal to the optical axis of the camera. This may be a situation when an object of interest is far away from the mirror and is close to the horizon. In this situation, a larger value will be chosen for angle A and a smaller value will be chosen for angle B, thereby increasing the size of the portion to be removed from the panoramic mirror and lowering the upper limit of the controlled vertical field of view, respectively. This in turn will focus the desired vertical field of view to the sides of the mirror. Although this configuration will tend to increase the resolution in the vertical direction, as explained above, care must be taken to ensure that the horizontal resolution at the target image is sufficient. In this embodiment, the target object that the user would like to see will usually be on the horizon. Thus, even when the controlled vertical field of view is tightly focused, as in this case, the horizon will still be situated somewhere between the upper and lower limit of the controlled vertical field of view, and will still have an acceptable horizontal resolution. This is illustrated in FIG. 20. For example, angle A may be chosen to be about 45°, shown in FIG. 20 as 104, and angle B may be chosen to be about 100°, as shown in FIG. 20 as 106. This will focus the resulting desired vertical field of view 108 on the object 110 that is off in the distance as shown in FIG. 20.

In one embodiment, a compensated equi-angular mirror with a controlled vertical field of view is manufactured with a hole centered at the axial center of the mirror in order to accommodate various mounting devices. The mounting hole may range in diameter from about 0.05 cm to about 15 cm, preferably from about 0.1 cm to about 5 cm. In a particular embodiment the mounting hole is 0.64 cm in diameter.

Figure 21:
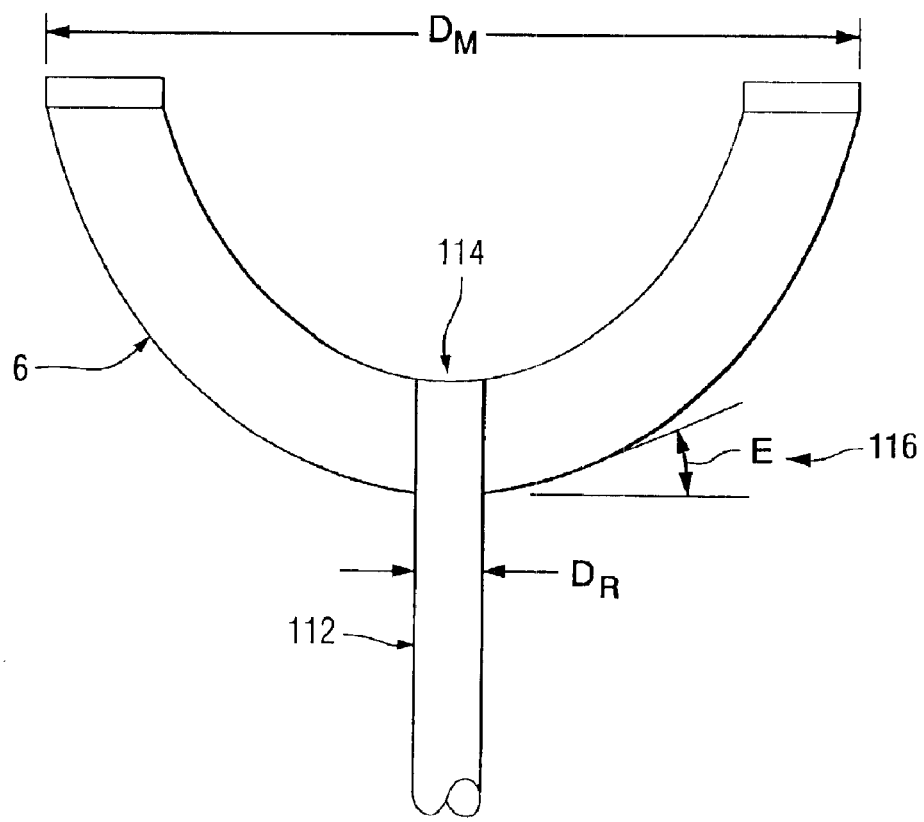
FIG. 21 illustrates a means for mounting a panoramic mirror in front of a camera, in accordance with an embodiment of the present invention.

In one embodiment, as shown schematically in FIG. 21, a panoramic mirror with a profile substantially described by equation (4) can be fitted with a rod 112 to accommodate mounting the mirror 6 in front of a camera (not shown). The shape of the rod may be substantially cylindrical. The mirror 6 can be produced with a hole 114 at the axial center of the mirror in order to accommodate the rod 112. The mounting hole may range in diameter from about 0.05 cm to about 15 cm, preferably from about 0.1 cm to about 5 cm In a particular embodiment the mounting hole is 0.64 cm in diameter. The rod 112 may range in diameter $D_R$ from about 0.05 cm to about 15 cm, preferably from about 0.1 cm to about 5 cm. In a particular embodiment the rod is 0.64 cm in diameter. The rod 112 may be of various lengths, depending on the values chosen for $r_{camera}$, $d_{camera}$, $r_{mount}$, $d_{mount}$, and A'. The rod 112 may range in length from about 3 cm to about 12 cm, preferably from about 4 cm to about 11 cm. In a particular embodiment the rod is about 10.8 cm in length. In this embodiment, the diameter $D_M$ of the mirror 6 may range from about 0.3 cm to about 60 cm, preferably from about 0.5 cm to about 20 cm. In a particular embodiment the diameter of the mirror is 7.94 cm in diameter. In this embodiment, a ratio of the diameter of the rod 112 to the diameter of the mirror 6 may be defined as $D_R:D_M$. $D_R:D_M$ may range from about 1:4, preferably from about 1:5. In a particular embodiment, $D_R:D_M$ is 1:12.5. In this embodiment, an angle E 116 may be formed with respect to a first plane perpendicular to the central axis of the mirror at a point of intersection between the rod and the mirror. Angle E is dependant upon angle A, which defines the lower limit of the controlled vertical field of view. Equation (7) shows the relationship between angle E and angle A as:

$$E = (a\ \tan(r_R/r_{camera}) + \alpha \cdot a\ \tan(r_R/r_{camera}) + A)/2 \qquad (7)$$

In equation (7), $r_R$ is the radius of the rod. Angle E ranges from about 5° to about 30°, preferably from about 10° to about 20°, more preferably from about 12° to about 16°. In a particular embodiment, angle E is about 14°.

Figure 22:
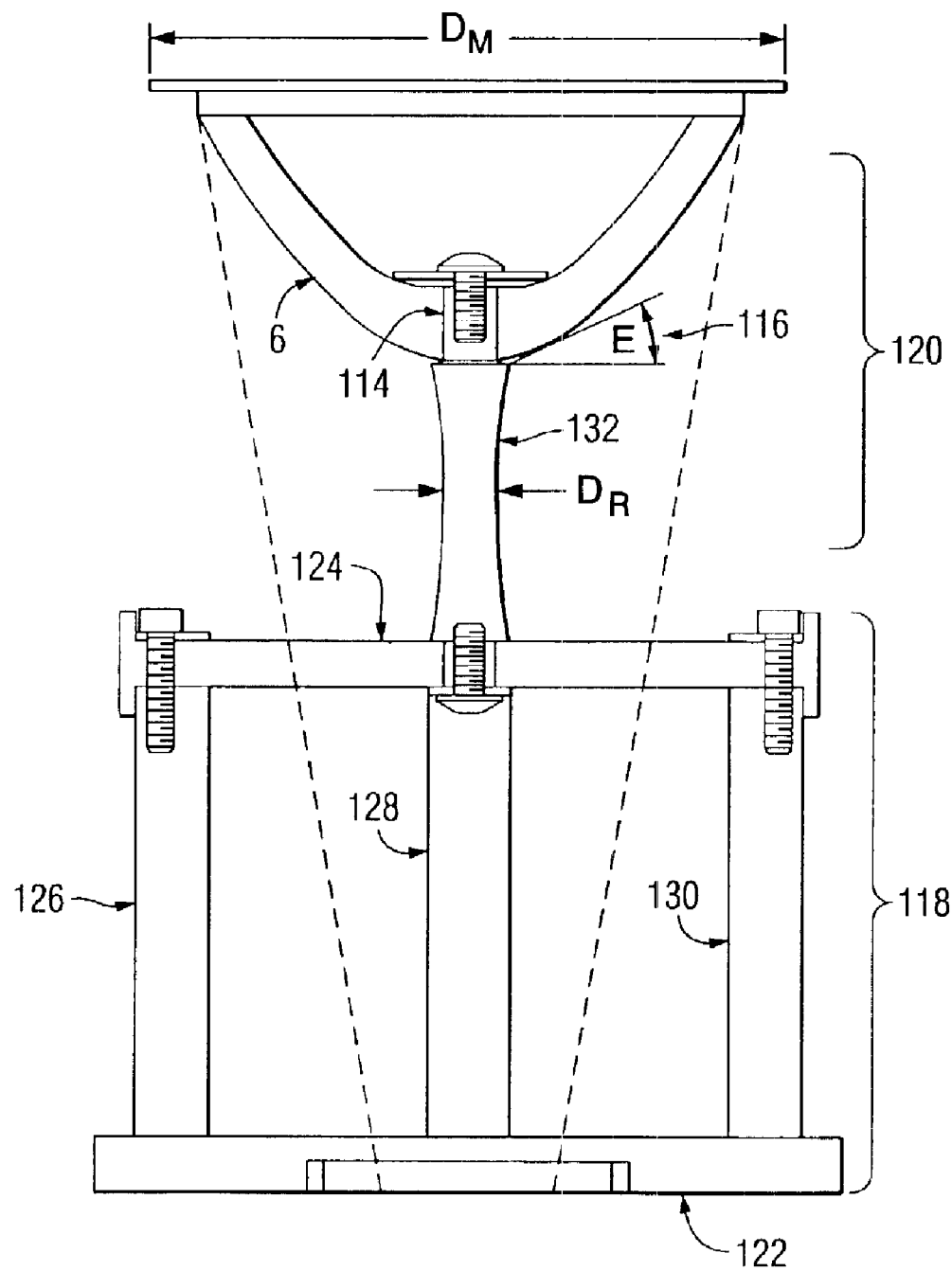
FIG. 22 shows an alternate means for mounting a panoramic mirror in front of a camera, in accordance with an embodiment of the present invention.

In another embodiment, a compensated equi-angular mirror with a controlled vertical field of view can be mounted in front of a camera as schematically illustrated in FIG. 22. This mounting device comprises a primary stage 118 which attaches directly to a camera (not shown), and a secondary stage 120 which is affixed to the primary stage and supports the mirror 6 in front of a camera. The primary stage 118 comprises a first disc 122 and a second disc 124 with a first vertical member 126, a second vertical member 128 and a third vertical member 130 placed between the two discs as shown in FIG. 22. The first disc 122 and the second disc 124 may range in diameter from about 3 cm to about 12 cm, preferably from about 5 cm to about 12 cm. In a particular embodiment the diameter of the first disc or the second disc may be about 8 cm. In this embodiment, the length of the first, second and third vertical members may range in length from about 1 cm to about 8 cm, preferably from about 2 cm to about 7 cm. In a particular embodiment the first vertical member, second vertical member and third vertical member is each about 5.9 cm in length. In this embodiment, the length of the primary stage may range in length from about 1 cm to about 8 cm, preferably from about 2 cm to about 7 cm. In a particular embodiment the primary stage is about 6.5 cm in length. In one embodiment, the second stage 120 may comprise a rod 132 with one end of the rod attached to the second disc 124 of the first stage 118 and the other end of the rod supporting the mirror 6 in front of a camera. The shape of the rod may be substantially cylindrical. In this embodiment, the mirror 6 may be produced with a hole 114 at the axial center of the mirror in order to accommodate the rod. The mounting hole may range in diameter from about 0.05 cm to about 15 cm, preferably from about 0.15 cm to about 5 cm. In a particular embodiment the mounting hole is 0.64 cm in diameter. The rod 132 may range, along the length thereof, in diameter $D_R$ from about 0.05 cm to about 15 cm, preferably from about 0.15 cm to about 5 cm. In a particular embodiment the rod is 0.64 cm in diameter. The rod 132 may be of various lengths, depending on the values chosen for $r_{camera}$, $d_{camera}$, $r_{mount}$, $d_{mount}$, and A'. The rod may range in length from about 2 cm to about 6 cm, preferably from about 3 cm to about 5 cm. In a particular embodiment the rod is about 4.3 cm in length. In this embodiment, the $D_M$ of the mirror may range from about 0.3 cm to about 60 cm, preferably from about 0.6 cm. to about 20 cm. In a particular embodiment the diameter of the mirror is 7.94 cm. in diameter. In this embodiment, a ratio of the diameter of the rod to the diameter of the mirror may be defined as $D_R:D_M$. $D_R:D_M$ may range from about 1:4, preferably from about 1:5. In a particular embodiment, $D_R:D_M$ is about 1:12.5. In this embodiment, an angle E 116 may be formed with respect to a first plane perpendicular to the central axis of the mirror at a point of intersection between the rod and the mirror. Angle E is dependant upon angle A, which defines the lower limit of the controlled vertical field of view. Equation (7), above, shows the relationship between angle E and angle A. Angle E ranges from about 5° to about 30°, preferably from about 10° to about 20°, more preferably from about 12° to about 16°. In a particular embodiment, angle E is about 14°.

Figure 23:
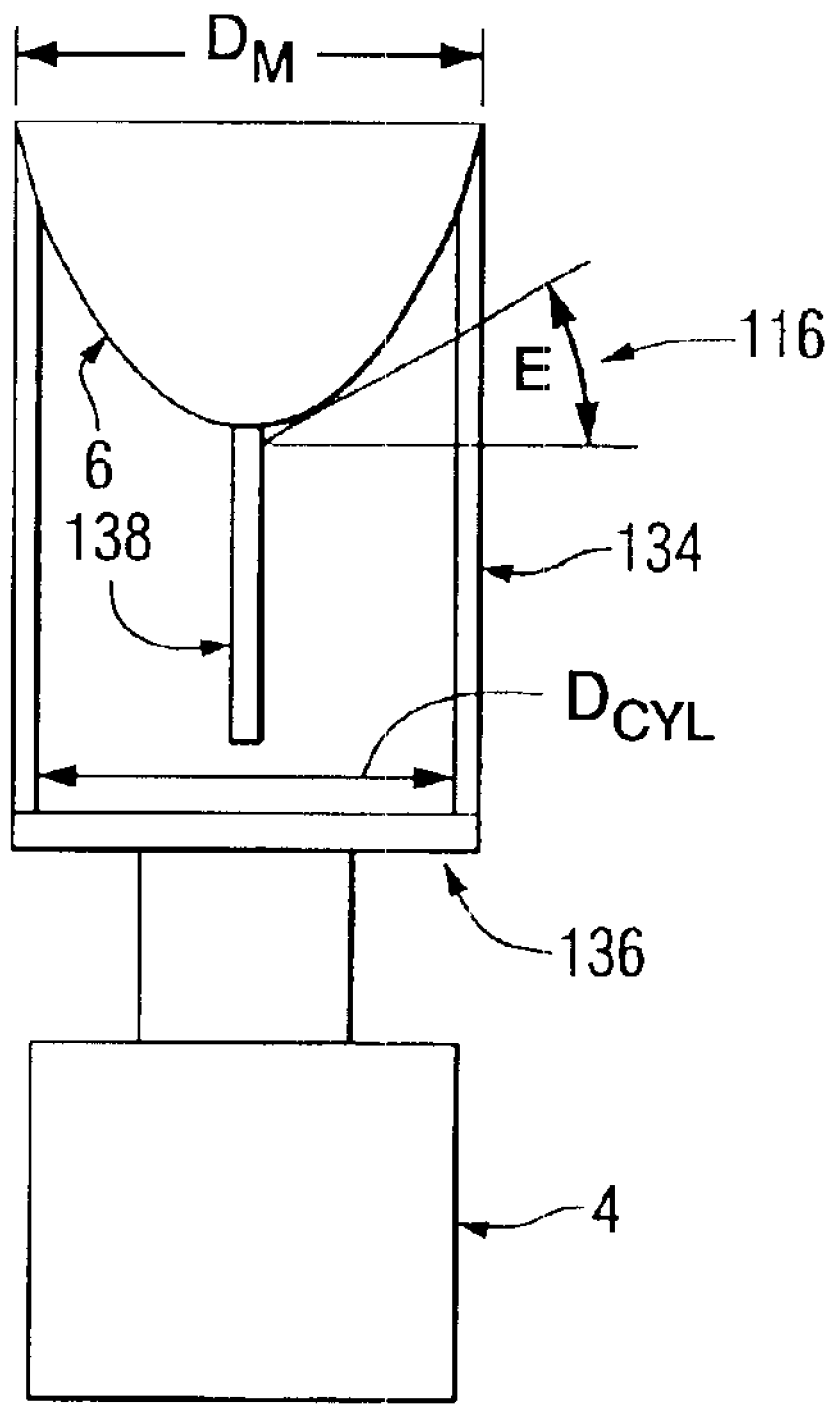
FIG. 23 illustrates an alternate means for mounting a panoramic mirror in front of a camera, in accordance with an embodiment of the present invention.

In another embodiment, as shown schematically in FIG. 23, a compensated equi-angular mirror 6 with a controlled vertical field of view may be mounted in front of a camera 4 by using a cylinder 134 that attaches to a standard camera lens mount 136. In this embodiment, the diameter $D_{CYL}$ of the cylinder 134 may range from about 0.3 cm to about 60 cm, preferably from about 0.6 cm to about 20 cm. In a particular embodiment the diameter of the cylinder is about 8.5 cm. In this embodiment, the thickness of the cylinder 146 may range from about 0.2 cm to about 0.4 cm, preferably from about 0.25 cm to about 0.35 cm. In a particular embodiment the thickness of the cylinder is about 0.32 cm. The cylinder 134 may be of various lengths, depending on the values chosen for $r_{camera}$, $d_{camera}$, $r_{mount}$, $d_{mount}$, and A'. In one embodiment, the cylinder 134 may range in length from about 3 cm to about 12 cm, preferably from about 4 cm to about 11 cm. In a particular embodiment the cylinder is about 10.8 cm in length. In this embodiment, the diameter $D_M$ of the mirror 6 may range from about 0.3 cm to about 60 cm, preferably from about 0.6 cm. to about 20 cm. In a particular embodiment the diameter of the mirror is about 7.86 cm. In one embodiment, a rod or needle 138 may be attached to the axial center of the panoramic mirror and may extend downward into the cylinder. This rod or needle serves to reduce reflections in the mirror that may be caused by the cylinder. The rod or needle may be substantially cylindrical in shape. In this embodiment, the length of the rod or needle 138 may range from about 5 cm to about 10 cm, preferably from about 6 cm to about 9 cm. In a particular embodiment the length of the rod or needle is about 8 cm. In this embodiment, the rod or needle 138 may range in diameter from about 0.05 cm to about 15 cm, preferably from about 0.15 cm to about 5 cm. In a particular embodiment the rod or needle is 0.64 cm in diameter. In this embodiment, an angle E 116 may be formed with respect to a first plane perpendicular to the central axis of the mirror at a point of intersection between the rod or needle and the mirror. Angle E is dependant upon angle A, which defines the lower limit of the controlled vertical field of view. Equation (7), above, shows the relationship between angle E and angle A. Angle E ranges from about 5° to about 30°, preferably from about 10° to about 20°, more preferably from about 12° to about 16°. In a particular embodiment, angle E is about 14°.

In a preferred embodiment, a compensated equi-angular mirror with a desired vertical field of view having a lower limit A' of about 40° and an upper limit B' of about 140° is designed with a controlled vertical field of view having an angle A equal to about 10° and an angle B equal to about 140°, a $VP_r$ of about 1,000 pixels, an α equal to about 11, and a diameter $D_M$ of about 8 cm. The mirror is placed at a distance $r_{camera}$ from the camera of about 12 cm, and is placed on a mounting device with a $d_{mount}$ of about 4.25 cm. The mirror is placed at a distance $r_{mount}$ from the widest portion of the mirror mount of about 4.7 cm. In this embodiment, the mirror is mounted in front of a camera sold under the designation NIKON 990 by NIKON, or a camera sold under the designation NIKON 995 by NIKON, with a $d_{camera}$ of about 10.2 cm. The mirror is mounted on a rod that is about 0.64 cm thick. In this embodiment, a unique mirror shape is produced with an angle E of about 14° and an angle D of about 76°. In this embodiment, the primary concern is providing a high-resolution viewable panoramic image, not eliminating central obscurations from the viewable panoramic image.

In this embodiment, the particular parameters chosen provide a system that reflects panoramic images with a resolution unparalleled in the prior art. However, although the panoramic mirror has been designed to produce panoramic images with an optimal resolution, in this embodiment the design does not eliminate all unwanted portions of the panoramic image from the viewable panoramic image. In particular, by choosing a lower controlled vertical field of view limit to be 10°, portions of the camera, the camera lens, the mount supporting the mirror in front of the camera and/or other unwanted foreground images will appear towards the bottom of the resulting viewable panoramic image. These obstructions do not appear in the desired vertical field of view, but they are still undesirable to have in the resulting viewable panoramic image. Therefore, the resulting viewable panoramic image can be further enhanced by cropping the viewable panoramic image (i.e., masking, covering, or discarding certain portions of the viewable panoramic image) so that any unwanted portions of the panoramic image are fully eliminated from the viewable panoramic image.

In one embodiment, computer software is used to crop an additional amount of the panoramic image from the bottom of the viewable panoramic image. This amount to crop may range from about an additional 0° to about an additional 40°, preferably from about an additional 15° to an additional 35°. In a particular embodiment the computer software is used to crop an additional 30° from the bottom of the viewable panoramic image.

In another embodiment, computer software may be used to crop any unwanted portions of the panoramic image from the top of the resulting viewable panoramic image. In this embodiment, the computer software may be used to crop an additional 0° to an additional 10° from the top of the viewable panoramic image, preferably an additional 1° to an additional 5° from the top of the viewable panoramic image. In a particular embodiment, the computer software may be used to crop an additional 0° from the top of the viewable panoramic image.

Figure 24:
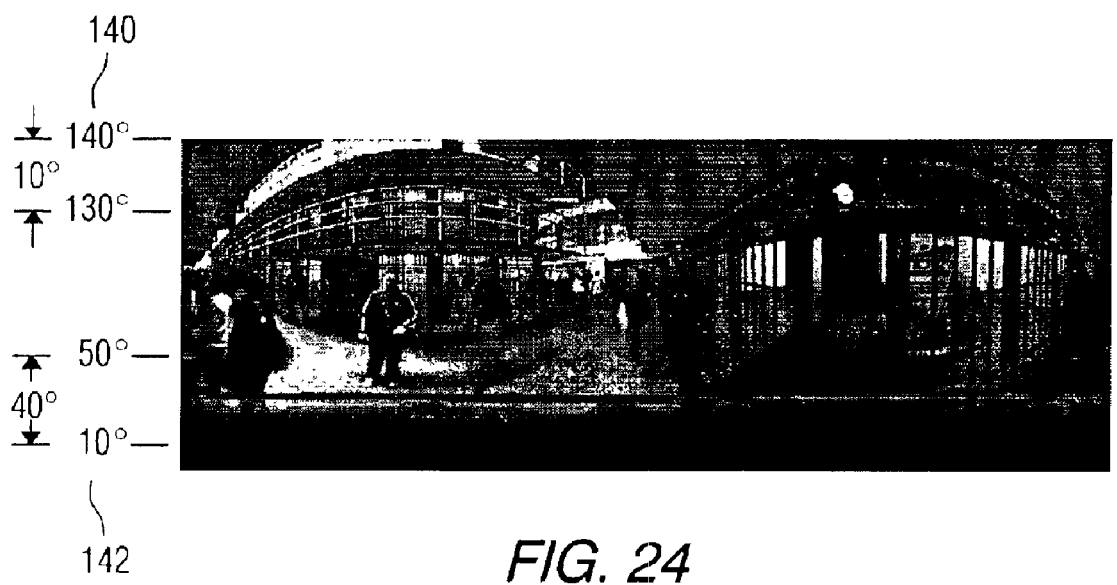
FIG. 24 shows how a panoramic image can be cropped in order to remove unwanted portions of the panoramic image from the resulting viewable panoramic image, in accordance with an embodiment of the present invention.

FIG. 24 shows a viewable panoramic image captured with a compensated equi-angular mirror with a controlled vertical field of view from 10° to 140°, and illustrates the additional top portion 140 of the viewable panoramic image that may be cropped with the computer software, and the additional bottom portion 142 of the viewable panoramic image that may be cropped with the computer software.

Figure 25:
FIG. 25 shows a viewable panoramic image captured with a compensated equi-angular mirror with a controlled vertical field of view from 10° to 140°, with an additional 30° cropped from the bottom portion of the viewable panoramic image and 0° cropped from the top portion of the viewable panoramic image, in accordance with an embodiment of the present invention.

FIG. 25 shows a viewable panoramic image captured with a compensated equi-angular mirror with a controlled vertical field of view from 10° to 140°, with an additional 30° cropped from the bottom portion of the viewable panoramic image, and 0° cropped from the top portion of the viewable panoramic image.

In another embodiment, the resulting viewable panoramic image may be further enhanced by allowing the viewer to change the viewing perspective of the resulting panoramic image. The viewing perspective is altered by allowing the user to "look" up and concentrate on the top portion of the resulting viewable panoramic image, to "look" down and concentrate more on the bottom portion of the resulting viewable panoramic image, to pan around the entire 360° horizontal field of view of the resulting viewable panoramic image, and/or to "zoom" in or out on portions of the resulting viewable panoramic image. In one embodiment, computer software is used to allow the viewer to alter the viewing perspective of the resulting viewable panoramic image. The viewer may use a mouse, a keyboard, a track ball or any other computer input device to facilitate altering the viewing perspective of the viewable panoramic image. In another embodiment, the viewer may use a head tracker coupled with a head mounted device to facilitate altering the viewing perspective of the viewable panoramic image. In this embodiment, the user is given the sense that he or she is standing in the center of the scene that was captured with the panoramic camera.

In another embodiment, multiple panoramic mirrors may be used in a panoramic imaging system in order to provide panoramic images with improved resolution. The panoramic mirrors may be designed and manufactured to have controlled vertical fields of view. In addition, these mirrors may be equi-angular shaped, compensated equi-angular shaped, parabolic shaped, hyperbolic shaped, spherical, or any other convex shaped mirror. Additionally, the multiple mirrors may be any combination of these shapes.

In another embodiment, multiple cameras may be used in a panoramic imaging system in order to improve the usable resolution with panoramic mirrors. These multiple cameras may be used singularly or in combination with one or more convex shaped panoramic mirrors with or without controlled vertical fields of view.

In one embodiment, a camera can be used with a rectangular sensing area. It is possible to 'zoom in' further to the mirror surface, which will allow the mirror image to occupy a larger proportion of the image. This comes at the cost of cropping part of the image surface. When imaging a compensated equiangular mirror manufactured with a controlled vertical field of view, for example, the field of view that has been lost by framing in this manner can be recovered using a second image that overlaps the first image in certain areas. This can be accomplished by using a two camera, two mirror system whose mirrors are positioned back-to-back and whose cameras are oriented 90° off-axis from one another.

Figure 26:
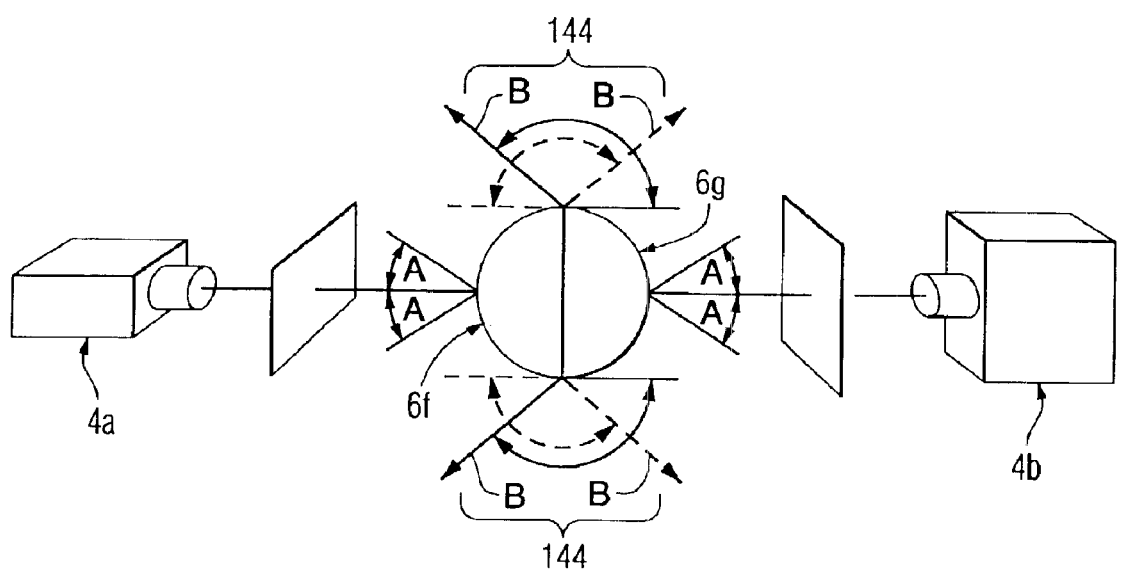
FIG. 26 shows a schematic diagram for providing panoramic images with increased resolution in accordance with an additional embodiment of the present invention.

A schematic diagram of this embodiment is shown in FIG. 26. Mirror 6f is placed back-to-back with mirror 6g, and camera 4a is oriented 90° off-axis from camera 4b. The vertical field of view for each mirror can be controlled by picking Angle A and angle B to give each panoramic mirror the best resolution. Additionally, the upper limit of the vertical field of view for mirror 6f will overlap with the upper limit of the vertical field of view for mirror 6g. These overlapping areas are marked in FIG. 26 as 144. The result is that the missing pieces of the viewable panoramic image from mirror 6f and camera 4a can be supplied by mirror 6g and camera 4b, and vice versa.

Although the present invention has been primarily described for use in a panoramic imaging system, such as the system of FIG. 1, it is to be understood that the apparatus and method of the present invention can be used in any other system that would benefit from the advantages disclosed herein and is within the scope of the present invention.

Although the use of a compensated equi-angular mirror designed with a controlled vertical field of view has been disclosed herein, it is to be understood that other types of panoramic mirrors may be designed with a controlled vertical field of view, thereby increasing the resolution of the resulting viewable panoramic images and are within the scope of the present invention. Examples may include, but are not limited to, a spherical panoramic mirror, a parabolic panoramic mirror, a hyperbolic panoramic mirror and a non-compensated equi-angular mirror.

Whereas particular embodiments of this invention have been described above for purposes of illustration, it will be evident to those skilled in the art that numerous variations of the details of the present invention may be made without departing from the invention as defined in the appended claims.

What is claimed is:

1. A panoramic photographic apparatus comprising:

a mirror; and means for mounting the mirror on an axis;

wherein the mirror includes a convex reflective surface symmetric about the axis, the surface forming a first angle C with respect to a first plane perpendicular to the axis substantially at a point of intersection between the axis and the mirror, the first angle C being at least about 0.5°, wherein the convex reflective surface comprises a surface of rotation defined by rotating around the axis a shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into a camera lens, r is the length of a light ray between the camera lens and a point on the surface of the mirror, α is a constant defining the gain, and k is a constant defined by $(-1-\alpha)/2$.

2. A panoramic photographic apparatus according to claim 1, wherein the first angle C ranges from about 0.5° to about 20°.

3. A panoramic photographic apparatus according to claim 1, wherein the first angle C ranges from about to about 10°.

4. A panoramic photographic apparatus according to claim 1, wherein the first angle C ranges from about 2° to about 8°.

5. A panoramic photographic apparatus according to claim 1, wherein the first angle C is about 5°.

6. A panoramic photographic apparatus according to claim 1, wherein the surface further forms a second angle D with respect to a second plane perpendicular to the axis at an end of the mirror opposite the point of intersection between the axis and the mirror, and with respect to a plane tangent to the mirror surface at the end of the mirror.

7. A panoramic photographic apparatus according to claim 6, wherein the second angle D ranges from about 50° to about 100°.

8. A panoramic photographic apparatus according to claim 1, wherein α ranges from about 3 to about 15.

9. A panoramic photographic apparatus according to claim 1, wherein the means for mounting the mirror on an axis comprises:

a cylinder;

wherein a first end of the cylinder is attached to a lens of a camera and wherein the mirror is mounted at a second end of the cylinder.

10. A panoramic photographic apparatus comprising:

a rod positioned on an axis; and a mirror mounted at a first end of the rod;

wherein the mirror includes a convex reflective surface symmetric about the axis, the surface forming a first angle E with respect to a first plane perpendicular to the axis at a point of intersection between the rod and the mirror, the first angle E being described by the equation:

$$E=(\text{atan}(r_R/r_{camera})+\alpha\cdot\text{atan}(r_R/r_{camera})+A)/2$$

where $r_R$ is the radius of the $r_{camera}$ is the distance the mirror is placed from a camera, α is a constant defining the gain, and A is at least about 0.5°.

11. A panoramic photographic apparatus according to claim 10, wherein the first angle E ranges from about 5° to about 30°.

12. A panoramic photographic apparatus according to claim 10, wherein the first angle E ranges from about 10° to about 20°.

13. A panoramic photographic apparatus according to claim 10, wherein the first angle E ranges from about 12° to about 16°.

14. A panoramic photographic apparatus according to claim 10, wherein the first angle E is about 14°.

15. A panoramic photographic apparatus according to claim 10, wherein the surface further forms a second angle D with respect to a second plane perpendicular to the axis at an end of the mirror opposite the point of intersection between the rod and the mirror, and with respect to a plane tangent to the mirror surface at the end of the mirror.

16. A panoramic photographic apparatus according to claim 15, wherein the second angle D ranges from about 50° to about 100°.

17. A panoramic photographic apparatus according to claim 10, wherein the convex reflective surface comprises a surface of rotation defined by rotating around the axis: an equi-angular shape, a compensated equi-angular shape, a parabolic shape, a hyperbolic shape, or a spherical shape.

18. A panoramic photographic apparatus according to claim 17, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into a camera lens, r is the length of a light ray between the camera lens and a point on the surface of the mirror, α is a constant defining the gain, and k is a constant defined by $(-1-\alpha)/2$.

19. A panoramic photographic apparatus according to claim 18, wherein α ranges from about 3 to about 15.

20. A panoramic photographic apparatus according to claim 10, wherein the mirror is supported by the rod.

21. A panoramic photographic apparatus according to claim 10, wherein the rod reduces unwanted reflections in the mirror.

22. A panoramic photographic apparatus according to claim 10, wherein the rod is substantially cylindrical in shape.

23. A system for providing enhanced panoramic images comprising:
   a mirror;
   means for mounting the mirror on an axis;
   wherein the mirror includes a convex reflective surface symmetric about the axis, the surface forming a first angle C with respect to a first plane perpendicular to the axis substantially at a point of intersection between the axis and the mirror, the first angle C being at least about 0.5°, wherein the convex reflective surface comprises a surface of rotation defined by rotating around the axis a shape described by the equation;

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into a camera lens, r is the length of a light ray between the camera lens and a point on the surface of the mirror, α is a constant defining the gain, and k is a constant defined by $(-1-\alpha)/2$; and
   a camera with a lens;
   wherein the camera is positioned so that the lens is substantially aligned with the axis.

24. A system for providing enhanced panoramic images according to claim 23, wherein the first angle C ranges from about 0.5° to about 20°.

25. A system for providing enhanced panoramic images according to claim 23, wherein the surface further forms a second angle D with respect to a second plane perpendicular to the axis at an end of the mirror opposite the point of intersection between the axis and the mirror, and with respect to a plane tangent to the mirror surface at the end of the mirror.

26. A system for providing enhanced panoramic images according to claim 25, wherein the second angle D ranges from about 50° to about 100°.

27. A system for providing enhanced panoramic images according to claim 23, wherein the means for mounting the mirror on the axis comprises:
   a cylinder;
   wherein a first end of the cylinder is attached to the lens of the camera and wherein the mirror is mounted at a second end of the cylinder.

28. A system for providing enhanced panoramic images according to claim 27, wherein the cylinder has a length of from about 3 cm to about 12 cm.

29. A system for providing enhanced panoramic images according to claim 27, wherein the mirror has a diameter of from about 0.3 cm to about 60 cm.

30. A system for providing enhanced panoramic images according to claim 23, wherein the system produces a high-resolution viewable panoramic image.

31. A system for providing enhanced panoramic images according to claim 23, wherein the system further comprises an additional mirror positioned adjacent the mirror and an additional camera positioned for cooperation with the additional mirror.

32. A system for providing enhanced panoramic images comprising:
   a mirror;
   a rod positioned on an axis;
   means for mounting the mirror on the axis;
   wherein the mirror includes a convex reflective surface symmetric about the axis, the surface forming a first angle E with respect to a first plane perpendicular to the axis at a point of intersection between the rod and the mirror, the first angle E being described by the equation:

$$E(\text{atan }(r_R/r_{camera})+\alpha\cdot\text{atan}(r_R/r_{camera})+A)/2$$

where $r_R$ is the radius of the rod, $r_{camera}$ is the distance the mirror is placed from a camera, α is a constant defining the gain, and A is at least about 0.5°; and
   a camera with a lens;
   wherein the camera is positioned so that the lens is substantially aligned with the axis.

33. A system for providing enhanced panoramic images according to claim 32, wherein the first angle E ranges from about 5° to about 30°.

34. A system for providing enhanced panoramic images according to claim 32, wherein the surface further forms a second angle D with respect to a second plane perpendicular to the axis at an end of the mirror opposite the point of intersection between the rod and the mirror, and with respect to a plane tangent to the mirror surface at the end of the mirror.

35. A system for providing enhanced panoramic images according to claim 34, wherein the second angle D ranges from about 50° to about 100°.

36. A system for providing enhanced panoramic images according to claim 32, wherein the convex reflective surface comprises a surface of rotation defined by rotating around the axis: an equi-angular shape, a compensated equi-angular shape, a parabolic shape, a hyperbolic shape, or a spherical shape.

37. A system for providing enhanced panoramic images according to claim 36, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into a camera lens, r is the length of a light ray between the camera lens and a point on the surface of the mirror, α is a constant defining the gain, and k is a constant defined by $(-1-\alpha)/2$.

38. A system for providing enhanced panoramic images according to claim 32, wherein the means for mounting the mirror on the axis comprises the rod and the mirror is mounted at a first end of the rod and a second end of the rod is attached to the camera.

39. A system for providing enhanced panoramic images according to claim 38, wherein the rod has a length of from about 3 cm to about 12 cm.

40. A system for providing enhanced panoramic images according to claim 38, wherein the rod has a diameter of from about 0.05 cm to about 15 cm.

41. A system for providing enhanced panoramic images according to claim 38, wherein the mirror has a diameter of from about 0.3 cm to about 60 cm.

42. A system for providing enhanced panoramic images according to claim 38, wherein the mounting rod has a diameter $D_R$, the mirror has a diameter $D_M$, and the ratio of $D_R:D_M$ is greater than 1:4.

43. A system for providing enhanced panoramic images according to claim 32, wherein the means for mounting the mirror on the axis comprises:

a primary stage, wherein the primary stage is attached to a camera; and a secondary stage, wherein the secondary stage is affixed to the primary stage.

44. A system for providing enhanced panoramic images according to claim 43, wherein the secondary stage comprises:

the rod;

wherein the mirror is mounted at a first end of the rod and a second end of the rod is attached to the primary stage.

45. A system for providing enhanced panoramic images according to claim 43, wherein the primary stage has a length of from about 1 cm to about 8 cm.

46. A system for providing enhanced panoramic images according to claim 44, wherein the rod has a length of from about 2 cm to about 6 cm.

47. A system for providing enhanced panoramic images according to claim 44, wherein the rod has a diameter of from about 0.05 cm to about 15 cm.

48. A system for providing enhanced panoramic images according to claim 43, wherein the mirror has a diameter of from about 0.3 cm to about 60 cm.

49. A system for providing enhanced panoramic images according to claim 44, wherein the rod has a diameter $D_R$, the mirror has a diameter $D_M$, and the ratio of $D_R:D_M$ is greater than 1:4.

50. A system for providing enhanced panoramic images according to claim 32, wherein the means for mounting the mirror on the axis comprises:

a cylinder;

wherein a first end of the cylinder is attached to the lens of the camera and wherein the mirror is mounted at a second end of the cylinder.

51. A system for providing enhanced panoramic images according to claim 50, wherein the cylinder has a length of from about 3 cm to about 12 cm.

52. A system for providing enhanced panoramic images according to claim 50, wherein the mirror has a diameter of from about 0.3 cm to about 60 cm.

53. A system for providing enhanced panoramic images according to claim 32, wherein the system produces a high-resolution viewable panoramic image.

* * * * *